US012082235B2

(12) United States Patent
Chen et al.

(10) Patent No.: US 12,082,235 B2
(45) Date of Patent: *Sep. 3, 2024

(54) SYSTEM AND METHOD FOR RANDOM ACCESS RESOURCE SELECTION

(71) Applicant: FG Innovation Company Limited, Tuen Mun (HK)

(72) Inventors: Hung-Chen Chen, Taipei (TW); Chie-Ming Chou, Taipei (TW); Yu-Hsin Cheng, Taipei (TW); Mei-Ju Shih, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,783

(22) Filed: May 23, 2023

(65) Prior Publication Data

US 2023/0292357 A1    Sep. 14, 2023

Related U.S. Application Data

(63) Continuation of application No. 17/469,163, filed on Sep. 8, 2021, now abandoned, which is a continuation
(Continued)

(51) Int. Cl.
*H04W 72/542* (2023.01)
*H04B 7/00* (2006.01)
(Continued)

(52) U.S. Cl.
CPC ............ *H04W 72/542* (2023.01); *H04B 7/00* (2013.01); *H04B 7/0695* (2013.01);
(Continued)

(58) Field of Classification Search
None
See application file for complete search history.

(56) References Cited

U.S. PATENT DOCUMENTS 11,147,078 B2 * 10/2021 Chen ................. H04W 36/0077
2015/0173047 A1 * 6/2015 Yamada ............ H04W 74/0833
370/329
(Continued)

OTHER PUBLICATIONS

"3rd Generation Partnership Project; Technical Specification Group Radio Access Network; NR; Medium Access Control (MAC) protocol specification (Release 15)", 3GPP TS 38.321 V15.2.0, Jun. 20, 2018 (Jun. 20, 2018), pp. 1-73, Section 5.1.1, Section 5.1.2, Section 5.1.3.
(Continued)

*Primary Examiner* — Saad Khawar
(74) *Attorney, Agent, or Firm* — ScienBiziP, P.C.

(57) ABSTRACT

A system and a method of random access resource selection are provided. The method includes a target Base Station (BS) transmitting a first Synchronization Signal Block (SSB) to a User Equipment (UE), the first SSB associated with a first contention-free random access resource for the UE to transmit a random access preamble; the target BS transmitting a second SSB to the UE, the second SSB associated with a contention-based random access resource; and in a case that a first Synchronization Signal-Reference Signal Received Power (SS-RSRP) of the first SSB is not greater than an SS-RSRP threshold and a second SS-RSRP of the second SSB is greater than the SS-RSRP threshold, the target BS receiving the random access preamble from the UE using the contention-based random access resource.

14 Claims, 21 Drawing Sheets

Related U.S. Application Data of application No. 16/153,705, filed on Oct. 6, 2018, now Pat. No. 11,147,078.

(60) Provisional application No. 62/568,900, filed on Oct. 6, 2017.

(51) Int. Cl.
| | |
|---|---|
| *H04B 7/06* | (2006.01) |
| *H04L 5/00* | (2006.01) |
| *H04W 36/00* | (2009.01) |
| *H04W 48/16* | (2009.01) |
| *H04W 72/044* | (2023.01) |
| *H04W 72/23* | (2023.01) |
| *H04W 74/00* | (2009.01) |
| *H04W 74/02* | (2009.01) |
| *H04W 74/04* | (2009.01) |
| *H04W 74/0833* | (2024.01) |

(52) U.S. Cl.
CPC ....... *H04L 5/0048* (2013.01); *H04W 36/0077* (2013.01); *H04W 72/046* (2013.01); *H04W 72/23* (2023.01); *H04W 74/006* (2013.01); *H04W 74/02* (2013.01); *H04W 74/04* (2013.01); *H04W 74/085* (2013.01); *H04L 5/0023* (2013.01); *H04W 48/16* (2013.01); *H04W 74/0833* (2013.01)

(56) References Cited

U.S. PATENT DOCUMENTS

| | | | |
|---|---|---|---|
| 2017/0231011 A1 | 8/2017 | Park et al. | |
| 2018/0343595 A1* | 11/2018 | da Silva | H04W 36/0072 |
| 2019/0037605 A1* | 1/2019 | Agiwal | H04W 56/001 |
| 2019/0053029 A1 | 2/2019 | Agiwal et al. | |
| 2019/0053271 A1 | 2/2019 | Islam et al. | |
| 2019/0053288 A1 | 2/2019 | Zhou et al. | |
| 2019/0313300 A1 | 10/2019 | Yiu et al. | |
| 2019/0327629 A1 | 10/2019 | Zhang et al. | |

OTHER PUBLICATIONS

Interdigital Inc: "Beam Selection for Handover in NR", R2-1710675, 3GPP TSG-RAN WG2 Meeting #99bis, Prague, Czech Republic, Sep. 29, 2017 (Sep. 29, 2017), Section 2.4.

Huawei et al: "Baseline handover procedure for inter gNB handover in NR", R2-1706705, 3GPP TSG-RAN WG2 Adhoc#2 on NR, Qingdao, China, Jun. 17, 2017 (Jun. 17, 2017), pp. 1-7, 2.Discussion.

Motorola Mobility et al., "RACH resource configuration and selection", R1-1714216, 3GPP TSG RAN WG1 Meeting #90, Prague, Czech Republic, Aug. 21-25, 2017.

Non-Final Rejection dated Oct. 29, 2019 for U.S. Appl. No. 16/153,705 which is the family member application of the instant application.

Final Rejection dated May 19, 2020 for U.S. Appl. No. 16/153,705 which is the family member application of the instant application.

Advisory Action dated Aug. 27, 2020 for U.S. Appl. No. 16/153,705 which is the family member application of the instant application.

Non-Final Rejection dated Mar. 3, 2021 for U.S. Appl. No. 16/153,705 which is the family member application of the instant application.

Notice of Allowance dated Jun. 14, 2021 for U.S. Appl. No. 16/153,705 which is the family member application of the instant application.

Non-Final Rejection dated Feb. 23, 2023 for U.S. Appl. No. 17/469,163 which is the parent member application of the instant application.

* cited by examiner

C: Common Random Access Resources
D: Dedicated Random Access Resources

C: Common Random Access Resources
D: Dedicated Random Access Resources associated with SSB(s)

C: Common Random Access Resources
D: Dedicated Random Access Resources associated with SSB(s)

C: Common Random Access Resources
D: Dedicated Random Access Resources associated with SSB(s)

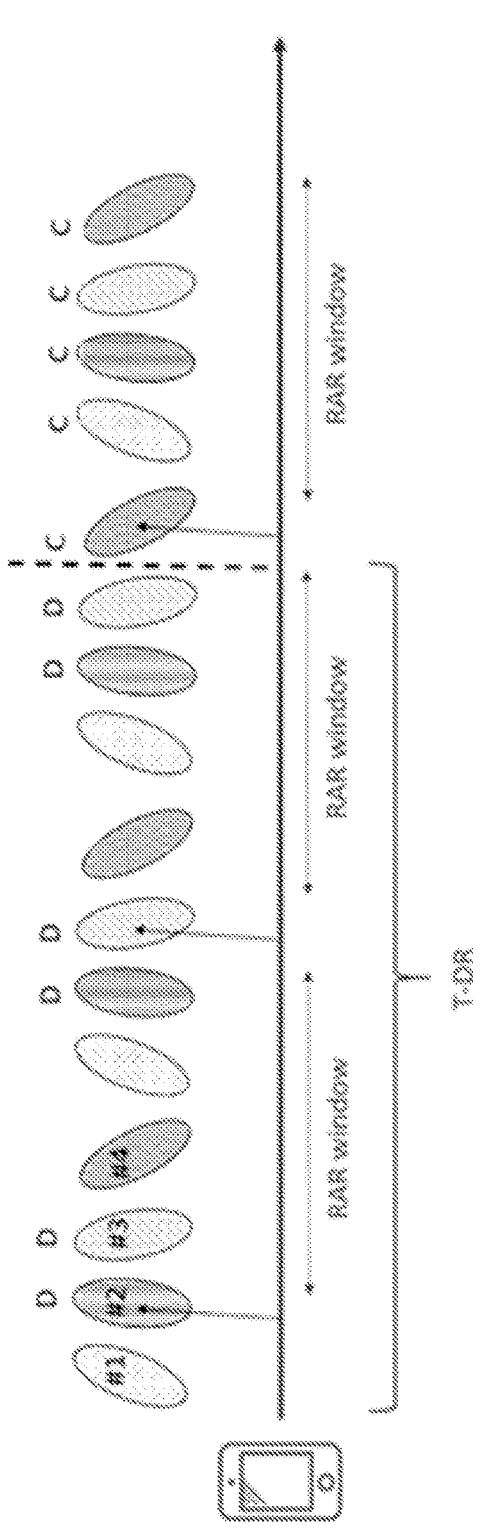

C: Common Random Access Resources
D: Dedicated Random Access Resources associated with CSI-RS(s)

C: Common Random Access Resources
D: Dedicated Random Access Resources associated with CSI-RS(s)

SYSTEM AND METHOD FOR RANDOM ACCESS RESOURCE SELECTION

CROSS-REFERENCE TO RELATED APPLICATION(S)

This application is a continuation application of U.S. patent application Ser. No. 17/469,163, filed on Sep. 8, 2021, which is a continuation application of U.S. patent application Ser. No. 16/153,705, filed on Oct. 6, 2018, now issued as U.S. Pat. No. 11,147,078, which claims the benefit of and priority to U.S. Provisional Patent Application Ser. No. 62/568,900, filed on Oct. 6, 2017, the contents of all of which are hereby incorporated herein fully by reference for all purposes.

FIELD

The present disclosure generally relates to wireless communication, and more particularly, to a system and a method for random access resource selection.

BACKGROUND

In a conventional wireless communication network, such as a Long-Term-Evolution (LTE) or evolved LTE (eLTE) network, a handover procedure includes having at least one source base station (e.g., an evolved NodeB (eNB) initiating a handover over an Xn interface through a Handover Request, a target base station performing admission control and providing a radio resource control (RRC) configuration as part of a Handover Acknowledgement, the at least one source base station then providing the RRC configuration to the UE having a Handover Command through RRC signaling, then the UE moving the connection to the target base station.

In the next generation (e.g., $5^{th}$ Generation New Radio (5G NR)) wireless communication networks, while network-based mobility may be based on similar principles and procedures as those in (e)LTE networks, in order to reduce latency, the Handover Command message may include dedicated random access configuration(s) for contention-free random access procedure. The UE may select a suitable beam from multiple beams of the target cell, and may perform contention-based random access on the UE selected beam if contention-free random access resources are not provided for the UE's selected beam. When dedicated random access configuration is present in the Handover Command message, questions still remain as to how A UE may select the random access resource(s) among dedicated random access configuration(s) and common random access configuration(s) in a multi-beam environment.

Thus, there is a need in the art for random access channel (RACH) resource selection in a multi-beam environment.

SUMMARY

The present disclosure is directed to a system and a method for random access resource selection in a multi-beam environment.

In a first aspect of the present disclosure, a random access resource selection for a User Equipment (UE) is disclosed, the method comprising: determining, by processing circuitry of the UE, whether a first Synchronization Signal-Reference Signal Received Power (SS-RSRP) of a first Synchronization Signal Block (SSB) is greater than a first threshold, when a contention-free random access resource associated with the first SSB is received; transmitting a random access preamble, by using the contention-free random access resource associated with the first SSB, when the first SS-RSRP of the first SSB is greater than the first threshold; transmitting the random access preamble, by using a contention-based random access resource associated with a second SSB, when the first SS-RSRP of the first SSB is not greater than the first threshold, wherein a second SS-RSRP of the second SSB is greater than the first threshold.

In some implementations of the first aspect of the present disclosure, the method further comprises: determining, by the processing circuitry, whether a contention-free random access resource associated with a channel state information reference signal (CSI-RS) is received, when the contention-free random access resource associated with the first SSB is not received; when the contention-free random access resource associated with the CSI-RS is received, determining, by the processing circuitry, whether a Channel State Information-Reference Signal Received Power (CSI-RSRP) of the CSI-RS is greater than a second threshold; when the CSI-RSRP of the CSI-RS is greater than the second threshold, transmitting the random access preamble by using the contention-free random access resource associated with the CSI-RS.

In some implementations of the first aspect of the present disclosure, the method further comprises: transmitting the random access preamble, by using a contention-based random access resource associated with a second SSB, when the CSI-RSRP of the CSI-RS is not greater than the second threshold; wherein a second SS-RSRP of the second SSB is greater than the first threshold.

In some implementations of the first aspect of the present disclosure, the method further comprises: determining, by the processing circuitry, whether a contention-free random access resource associated with a CSI-RS is received, when the contention-free random access resource associated with the first SSB is not received; transmitting the random access preamble, by using a contention-based random access resource associated of a second SSB, when the contention-free random access resource associated with the CSI-RS is not received; wherein a second SS-RSRP of the second SSB is greater than the first threshold.

In some implementations of the first aspect of the present disclosure, the method further comprises: determining by, the processing circuitry, whether another contention-free random access resource is greater than the first threshold or the second threshold for transmitting another random access preamble, when the random access preamble is transmitted by using the contention-based random access resource associated with the second SSB during a random access procedure, and when the another random access preamble transmission is required during the same random access procedure.

In some implementations of the first aspect of the present disclosure, the contention-free random access resource associated with the first SSB is received through radio resource control (RRC) signaling.

In some implementations of the first aspect of the present disclosure, the contention-free random access resource associated with the CSI-RS is received through RRC signaling.

In some implementations of the first aspect of the present disclosure, the first threshold is a RSRP threshold for SSBs (rsrp-ThresholdSSB).

In some implementations of the first aspect of the present disclosure, the second threshold is a RSRP threshold for CSI-RSs (rsrp-ThresholdCSI-RS).

In some implementations of the first aspect of the present disclosure, the method further comprises: determining whether a contention-based random access resource associated with the first SSB is received via dedicated RRC signaling; when the contention-based random access resource associated with the first SSB is received via the dedicated RRC signaling, transmitting the random access preamble using a contention-based random access resource in the dedicated RRC signaling; when the contention-based random access resource associated with the first SSB is not received via the dedicated RRC signaling, transmitting the random access preamble using a contention-based random access resource in a common random access configuration stored by the UE; wherein the contention-based random access resource in the common random access configuration is associated with the first SSB, and broadcasted by a source base station.

In a second aspect of the present disclosure, a UE is disclosed, the UE comprising: one or more non-transitory computer-readable media having computer-executable instructions embodied thereon; at least one processor coupled to the one or more non-transitory computer-readable media, and configured to execute the computer-executable instructions to: determine whether a first Synchronization Signal-Reference Signal Received Power (SS-RSRP) of a first Synchronization Signal Block (SSB) is greater than a first threshold, when a contention-free random access resource associated with the first SSB is received; transmit a random access preamble, by using the contention-free random access resource associated with the first SSB, when the first SS-RSRP of the first SSB is greater than the first threshold; transmit the random access preamble, by using a contention-based random access resource associated with a second SSB, when the first SS-RSRP of the first SSB is not greater than the first threshold, wherein a second SS-RSRP of the second SSB is greater than the first threshold.

In some implementations of the second aspect of the present disclosure, the at least one processor is further configured to execute the computer-executable instructions to: determine, by the processing circuitry, whether a contention-free random access resource associated with a channel state information reference signal (CSI-RS) is received, when the contention-free random access resource associated with the first SSB is not received; when the contention-free random access resource associated with the CSI-RS is received, determine, by the processing circuitry, whether a Channel State Information-Reference Signal Received Power (CSI-RSRP) of the CSI-RS is greater than a second threshold; transmit the random access preamble, by using the contention-free random access resource associated with the CSI-RS, when the CSI-RSRP of the CSI-RS is greater than the second threshold.

In some implementations of the second aspect of the present disclosure, the at least one processor is further configured to execute the computer-executable instructions to: transmit the random access preamble, by using a contention-based random access resource associated with a second SSB, when the CSI-RSRP of the CSI-RS is not greater than the second threshold; wherein a second SS-RSRP of the second SSB is greater than the first threshold.

In some implementations of the second aspect of the present disclosure, the at least one processor is further configured to execute the computer-executable instructions to: determine, by the processing circuitry, whether a contention-free random access resource associated with a CSI-RS is received, when the contention-free random access resource associated with the first SSB is not received; transmit the random access preamble, by using a contention-based random access resource associated of a second SSB, when the contention-free random access resource associated with the CSI-RS is not received; wherein a second SS-RSRP of the second SSB is greater than the first threshold.

In some implementations of the second aspect of the present disclosure, the at least one processor is further configured to execute the computer-executable instructions to: determine by, the processing circuitry, whether another contention-free random access resource is greater than the first threshold or the second threshold for transmitting another random access preamble, when the random access preamble is transmitted by using the contention-based random access resource associated with the second SSB during a random access procedure, and when the another random access preamble transmission is required during the same random access procedure.

In some implementations of the second aspect of the present disclosure, the contention-free random access resource associated with the first SSB is received through radio resource control (RRC) signaling.

In some implementations of the second aspect of the present disclosure, the contention-free random access resource associated with the CSI-RS is received through RRC signaling.

In some implementations of the second aspect of the present disclosure, the first threshold is a RSRP threshold for SSBs (rsrp-ThresholdSSB).

In some implementations of the second aspect of the present disclosure, the second threshold is a RSRP threshold for CSI-RSs (rsrp-ThresholdCSI-RS).

In some implementations of the second aspect of the present disclosure, the at least one processor is further configured to execute the computer-executable instructions to: determine whether a contention-based random access resource associated with the first SSB is received via dedicated RRC signaling; when the contention-based random access resource associated with the first SSB is received via the dedicated RRC signaling, transmitting the random access preamble using a contention-based random access resource in the dedicated RRC signaling; when the contention-based random access resource associated with the first SSB is not received via the dedicated RRC signaling, transmitting the random access preamble using a contention-based random access resource in a common random access configuration stored by the UE; wherein the contention-based random access resource in the common random access configuration is associated with the first SSB, and broadcasted by a source base station.

In a third aspect of the present disclosure, a method performed by a User Equipment (UE) for handover is provided. The method includes receiving a Radio Resource Control (RRC) message from a source base station; and performing a handover procedure to handover from the source base station to a target base station in response to the RRC message, wherein: the RRC message comprises one of a first dedicated random access configuration associated with a Channel State Information-Reference Signal (CSI-RS) of the target base station and a second dedicated random access configuration associated with a first Synchronization Signal Block (SSB) of the target base station, the CSI-RS is configured with a first dedicated random access resource by the first dedicated random access configuration, and the first SSB is configured with a second dedicated random access resource by the second dedicated random access configuration.

In a fourth aspect of the present disclosure, a UE for handover is provided. The UE includes a memory and a processing circuitry coupled to the memory. The processing circuitry is configured to receive an RRC message from a source base station; and perform a handover procedure to handover from the source base station to a target base station in response to the RRC message, wherein: the RRC message comprises one of a first dedicated random access configuration associated with a CSI-RS of the target base station and a second dedicated random access configuration associated with a first SSB of the target base station, the CSI-RS is configured with a first dedicated random access resource by the first dedicated random access configuration, and the first SSB is configured with a second dedicated random access resource by the second dedicated random access configuration.

In a fifth aspect of the present disclosure, a method of random access resource selection is provided. The method includes transmitting, by a target Base Station (BS), a first Synchronization Signal Block (SSB) to a User Equipment (UE), the first SSB associated with a first contention-free random access resource for the UE to transmit a random access preamble; transmitting, by the target BS, a second SSB to the UE, the second SSB associated with a contention-based random access resource; and in a case that a first Synchronization Signal-Reference Signal Received Power (SS-RSRP) of the first SSB is not greater than an SS-RSRP threshold and a second SS-RSRP of the second SSB is greater than the SS-RSRP threshold, receiving, by the target BS, the random access preamble from the UE using the contention-based random access resource, wherein: when dedicated Radio Resource Control (RRC) signaling, generated by the target BS, indicates the contention-based random access resource, the contention-based random access resource is determined based on the dedicated RRC signaling, and when the dedicated RRC signaling does not indicate the contention-based random access resource, the contention-based random access resource is determined based on a common random access configuration broadcast by a source BS.

In some implementations of the fifth aspect of the present disclosure, the method further includes transmitting, by the target BS, a Channel State Information Reference Signal (CSI-RS) to the UE, the CSI-RS associated with a second contention-free random access resource; and in a case that the UE does not receive the first contention-free random access resource associated with the first SSB and a Channel State Information-Reference Signal Received Power (CSI-RSRP) of the CSI-RS is greater than a CSI-RS threshold, receiving, by the target BS, the random access preamble from the UE using the second contention-free random access resource.

In some implementations of the fifth aspect of the present disclosure, the CSI-RS threshold comprises an RSRP threshold for CSI-RSs.

In some implementations of the fifth aspect of the present disclosure, the SS-RSRP threshold comprises an RSRP threshold for SSBs.

In some implementations of the fifth aspect of the present disclosure, the method further includes receiving, by the target BS, the random access preamble from the UE using the first contention-free random access resource in a case that the first SS-RSRP of the first SSB is greater than the SS-RSRP threshold.

In some implementations of the fifth aspect of the present disclosure, the method further includes transmitting, by the target BS, the dedicated RRC signaling to the source BS, wherein the UE receives, from the source BS, the dedicated RRC signaling after the source BS receives the dedicated RRC signaling from the target BS.

In some implementations of the fifth aspect of the present disclosure, the dedicated RRC signaling indicates to the UE to handover to the target BS.

In a sixth aspect of the present disclosure, a system for random access resource selection is provided. The system includes a source Base Station (BS) and a target BS. The source BS is configured to broadcast a common random access configuration. The target BS is configured to: transmit a first Synchronization Signal Block (SSB) to a User Equipment (UE), the first SSB associated with a first contention-free random access resource for the UE to transmit a random access preamble; transmit a second SSB to the UE, the second SSB associated with a contention-based random access resource; and in a case that a first Synchronization Signal-Reference Signal Received Power (SS-RSRP) of the first SSB is not greater than an SS-RSRP threshold and a second SS-RSRP of the second SSB is greater than the SS-RSRP threshold, receive the random access preamble from the UE using the contention-based random access resource, wherein: when dedicated Radio Resource Control (RRC) signaling, generated by the target BS, indicates the contention-based random access resource, the contention-based random access resource is determined based on the dedicated RRC signaling, and when the dedicated RRC signaling does not indicate the contention-based random access resource, the contention-based random access resource is determined based on the common random access configuration broadcast by the source BS.

In some implementations of the sixth aspect of the present disclosure, the target BS is further configured to: transmit a Channel State Information Reference Signal (CSI-RS) to the UE, the CSI-RS associated with a second contention-free random access resource to the UE; and in a case that the UE does not receive the first contention-free random access resource associated with the first SSB and a Channel State Information-Reference Signal Received Power (CSI-RSRP) of the CSI-RS is greater than a CSI-RS threshold, receive the random access preamble from the UE using the second contention-free random access resource.

In some implementations of the sixth aspect of the present disclosure, the CSI-RS threshold comprises an RSRP threshold for CSI-RSs.

In some implementations of the sixth aspect of the present disclosure, the SS-RSRP threshold comprises an RSRP threshold for SSBs.

In some implementations of the sixth aspect of the present disclosure, the target BS is further configured to: receive the random access preamble from the UE using the first contention-free random access resource in a case that the first SS-RSRP of the first SSB is greater than the SS-RSRP threshold.

In some implementations of the sixth aspect of the present disclosure, the target BS is further configured to: transmit the dedicated RRC signaling to the source BS, wherein the UE receives, from the source BS, the dedicated RRC signaling after the source BS receives the dedicated RRC signaling from the target BS.

In some implementations of the sixth aspect of the present disclosure, the dedicated RRC signaling indicates to the UE to handover to the target BS.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 20 is a schematic diagram illustrating detectable beams associated with one or more common random access resource(s) and/or dedicated random access resources during a handover procedure, according to an example implementation of the present application.

FIG. 21 is a schematic diagram illustrating detectable beams associated with one or more common random access resource(s) and/or dedicated random access resources during a handover procedure, according to an example implementation of the present application.

DETAILED DESCRIPTION

Figure 1:
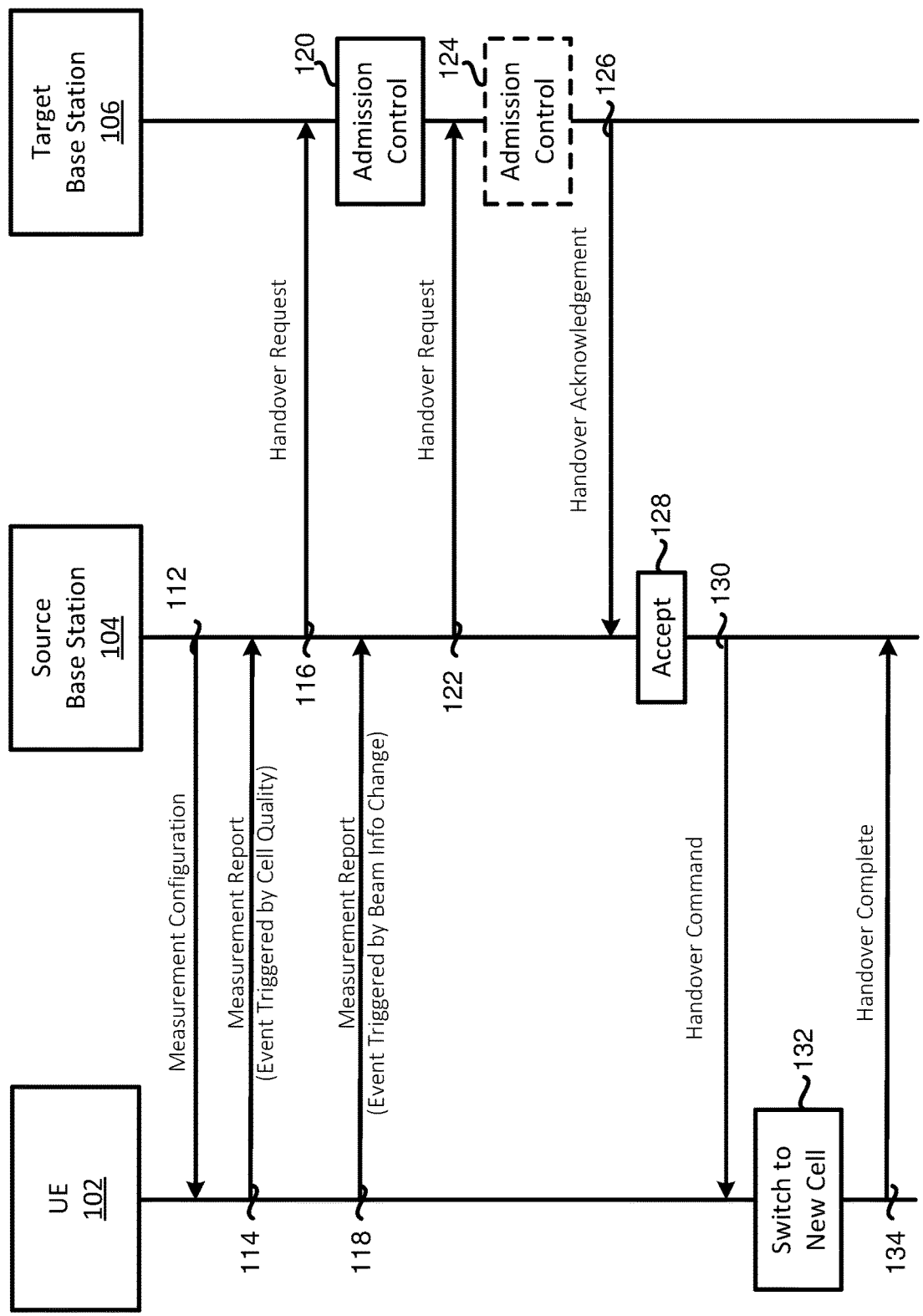
FIG. 1 is a schematic diagram illustrating a handover procedure for a UE to switch from a source base station to a target base station, according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may include computer-executable instructions stored on a computer readable medium such as a memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long-term evolution (LTE) system, an LTE-Advanced (LTE-A) system, or an LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above-mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as eMBB, mMTC, and URLLC, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

Case 1: Event-Triggered Measurement Report Based on Beam Information Change

According to implementations of the present application, a source base station (e.g., a source gNB) may initiate a handover procedure in response to a measurement report triggered by the measurement configuration(s) set for the UE. As multiple beams in higher frequencies are employed in the next generation wireless communication networks, measurement reports may include beam information, such as beam index(ices) with or without beam measurement results. According to the beam information from the target base station (e.g., a gNB), the target base station may preserve dedicated random access resource(s) by setting the dedicated random access configuration(s) in order for the UE to switch to the target cell. Due to latency of the Xn interface, the most suitable beam(s) of the target cell for the UE may change due to various factors, such as UE's mobility. In some instances, the preserved dedicated random access resource(s) (e.g., beams) may become unusable, such that the UE needs to use common random access resource(s), which may result in delay in the handover procedure and wasting network resources.

For the event-triggered measurement report, the triggering event may be related to whether the cell quality is above (or below) a given cell-level threshold in response to the specified formula. That is, when the corresponding beam information is changed, the source base station would not receive the changed beam information. For example, the measurement report of a neighboring cell A is sent because its cell quality fulfilling the triggering condition. The cell quality of cell A and the related beam information (e.g., beam #2, which may be identified by SSB or CSI-RS in response to the measurement configuration), are included in the corresponding measurement report. In the beam information, it indicates that beam #2 is the best beam at the time of measurement. The source base station may initiate a handover procedure with a target base station in response to the measurement report, and the target base station may preserve dedicated random access resource(s) associated with beam #2 for fast access. However, due to the UE mobility, when the source base station receives the Handover Command, for example, via a non-ideal Xn interface, and transmits the synchronous reconfiguration (e.g., ReconfigurationWithSync including parameters for synchronous reconfiguration to the target SpCell) contained in the Handover Command to the UE, the UE may have moved to the coverage of another beam (e.g., beam #3). According to dedicated random access configuration(s), the UE would attempt to perform the random access procedure via the dedicated random access resource(s) associated with beam #2 first. Then, the UE may try to perform the random access procedure via common random access resources(s) of other (detectable) beam(s) being it is able to switch to the target cell, or else the UE would have to trigger an RRC Connection Re-establishment procedure due to the expiration of a configured timer (similar to timer T304 as in LTE).

Implementations of the present application substantially eliminate the situation where the source base station and/or the target base station do not know that the beam information is no longer valid.

Implementations of the present application allow a measurement report to be triggered by beam information change, thereby increasing the success rate of the Handover procedure while allowing beam refinement.

In some implementations, a source base station transmits the measurement configurations to indicate the measurement objects and the associated report configurations. When the source base station desires to trigger the measurement report based on beam information change, a new information element (IE) "ReportOnBeamInfoChanged" is set to true. It should be noted that the "ReportOnBeamInfoChanged" IE may only apply for the cell(s) that still fulfill the triggering condition and not fulfill the leave condition. The triggered cell may fulfill the leave condition later and will be considered as a non-triggered cell afterward. In such a case, the UE does not report any changed beam information for the non-triggered cell.

In some implementations, when the "ReportOnBeamInfoChanged" IE is set to true, it may mean that when the reported beam(s) is changed compared to the previous measurement report, a new measurement report with new beam information may be triggered and sent to the source base station. In the measurement configuration(s), the network may set the parameter X for SSB(s) or the parameter Y for CSI-RS(s) to indicate the maximum beam index(ices) to be reported, in a descending order in response to the beam measurement result(s), where the qualities of the beams are above the predetermined threshold. For example, if in the previous event-triggered measurement report, the reported beam index is #1. However, when the UE determines that the best beam has changed to beam #2 for the same triggered cell, based on new beam measurements, then a new measurement report with new cell quality and the new reported beam index is sent to the source base station.

In some implementations, when the "ReportOnBeamInfoChanged" IE is set to true, it may mean that when the beam information is entirely different from what's in the previous measurement report, a new measurement report with new beam information may be triggered and sent to the source base station. For example, if in the previous event-triggered measurement report, the reported beam indices are #1 and #2. However, the UE determines that for the same triggered cell, the reported beam indices (e.g., a new set of best beam indices) are now #2 and #3, based on new beam measurements, then a new measurement report with the new cell quality and new beam information is reported to the source base station.

In some implementations, when the "ReportOnBeamInfoChanged" IE is set to true, it may mean that when the reported beam set (e.g., a new set of best beams indices) is not the same as the previous reported beam set, a new measurement report with the new beam information may be triggered and sent to the source base station. For example, in the previous event-triggered measurement report, the reported beam indices are #1 and #2. However, the UE determines that, for the same triggered cell, the reported beam indices (e.g., a new set of best beam indices) are now #2 and #1, based on new beam measurements, then a new measurement report with new cell quality and new beam information may not need to be reported to the source base station. In another example, in the previous event-triggered measurement report, the reported beam indices are #1 and #2. However, the UE determines that, for the same triggered cell, the reported beam indices (e.g., a new set of best beam indices) are now #2 and #3, based on new beam measurements, then the new measurement report with new cell quality and new beam information may be reported to the source base station.

The following are various implementations to increase the hit rate of dedicated random access resource(s), by setting the new "ReportOnBeamInfoChanged" IE to get the latest beam information.

In Case 1-1, the source base station keeps updating the beam information to the target base station (if necessary) before the source base station receives the Handover Acknowledgment. As discussed in detail below, in Case 1-1-1, the source base station keeps updating the beam information without Handover Request ID. In Case 1-1-2, the source base station keeps updating the beam information with Handover Request ID (e.g., accept case). In Case 1-1-3, the source base station keeps updating the beam information with Handover Request ID (e.g., suspend case).

In Case 1-2, when new beam information of the triggered cell is received, the source base station waits for the Handover Acknowledgement in response to the original handover request, and suspends the Handover Command to the UE. Then, the source base station initiates another handover request with new beam information. As discussed in detail below, under Case 1-2, the base station sends a new Handover Request with new beam information only after receiving a Handover acknowledgement (ACK)/non-acknowledgement (NACK).

In Case 1-3, when the target base station is able to allocate dedicated random access resources aggressively such that the source base station could indicate both UE and the target base station where the dedicated random access resource(s) are preserved for fast access, (e.g., using a bit map for beams). In this case, once the source base station decides the dedicated random access resource(s) to keep), it would notify the target base station to release the unused dedicated random access resource(s).

As discussed in detail below, in Case 1-3-1, the source base station indicates which dedicated random access configuration(s) to use, and notifies the target base station to release the unused dedicated random access configuration(s). In Case 1-3-2, the source base station indicates which dedicated random access configuration(s) to use, but doesn't notify the target base station to release the unused dedicated random access configuration(s). In Case 1-3-3, the source base station indicates which kind of dedicated random access configuration(s) to use (associated with SSB(s) or CSI-RS(s)), and notifies the target base station to release the unused dedicated random access configuration(s). In Case 1-3-4, the source base station indicates which kind of dedicated random access configuration(s) to use (associated with SSB(s) or CSI-RS(s)), but does not notify the target base station to release the unused dedicated random access configuration(s).

In Case 1-1-1, FIG. 1 illustrates a handover procedure for UE 102 to switch from source base station (e.g., source gNB) 104 to target base station (e.g., target gNB) 106, where the handover procedure in FIG. 1 includes actions 112, 114, 116, 118, 120, 122, 124, 126, 128, 130, 132, and 134. In the handover procedure in FIG. 1, source base station 104 does not know which beam information is used by target base station 106 for admission control (e.g., action 124). Thus, source base station 104 may only send the Handover Command (e.g., action 130) to UE 102 as shown in FIG. 1.

Figure 2:
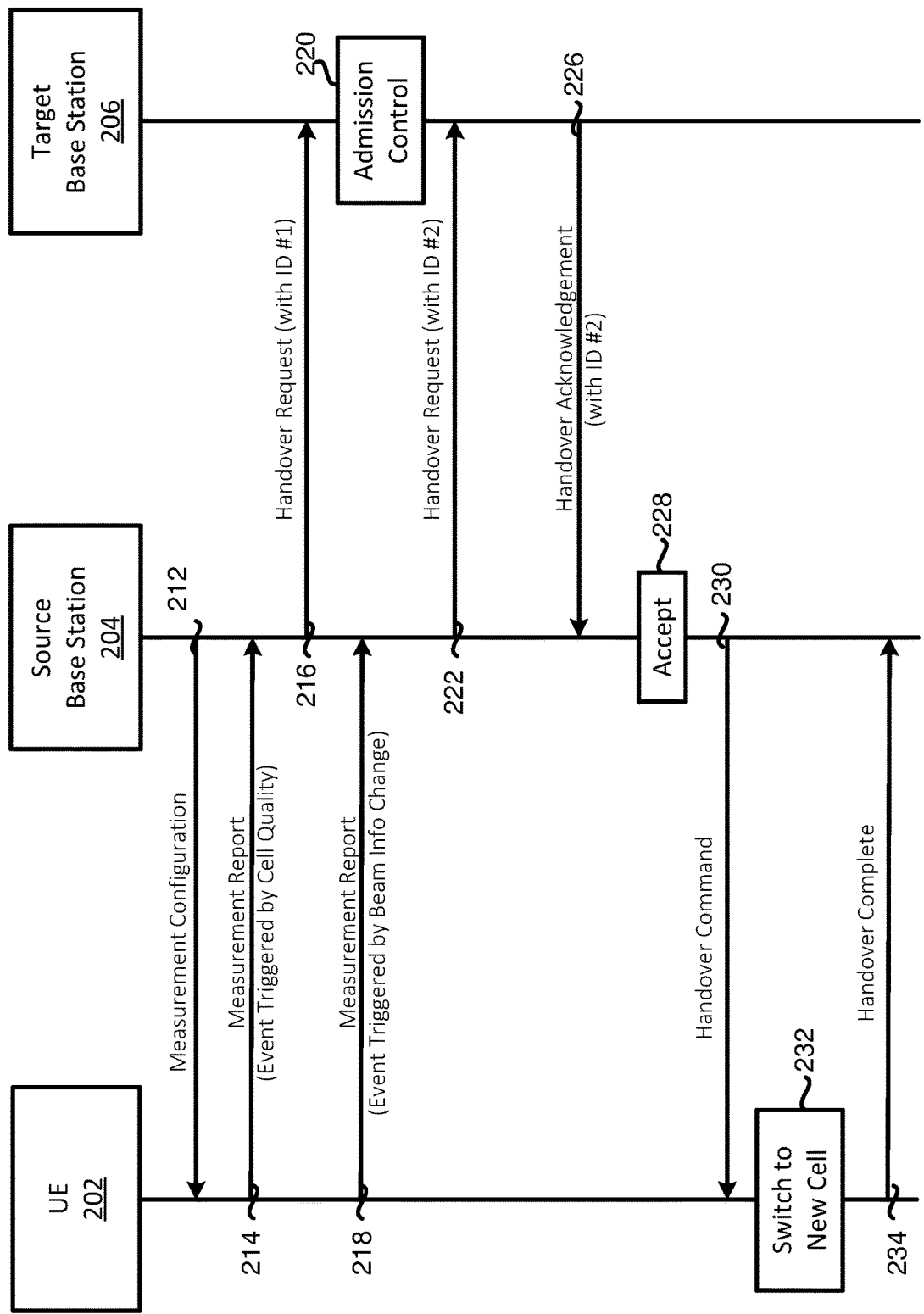
FIG. 2 is a schematic diagram illustrating a handover procedure for a UE to switch from a source base station to a target base station, according to an example implementation of the present application.

In Case 1-1-2, FIG. 2 illustrates a handover procedure for UE 202 to switch from source base station (e.g., source gNB) 204 to target base station (e.g., target gNB) 206, where the handover procedure includes actions 212, 214, 216, 218, 220, 222, 226, 228, 230, 232, and 234. In the handover procedure in FIG. 2, one or more unique IDs are added in the field of the Handover Request message.

When target base station 206 transmits the Handover Acknowledgement message back to source base station 204, target base station 206 includes the unique ID(s) of which the Handover Request is considered in the field of the Handover Acknowledgement message. Based on the ID(s) in the field of the Handover Acknowledgement message, source base station 204 may determine whether the Handover Command message is acceptable or not (e.g., whether target base station 206 refers to the latest beam information for admission control). If source base station 204 determines that the Handover Command message is acceptable, it transmits the Handover Command message to UE 202 as shown in FIG. 2.

Figure 3:
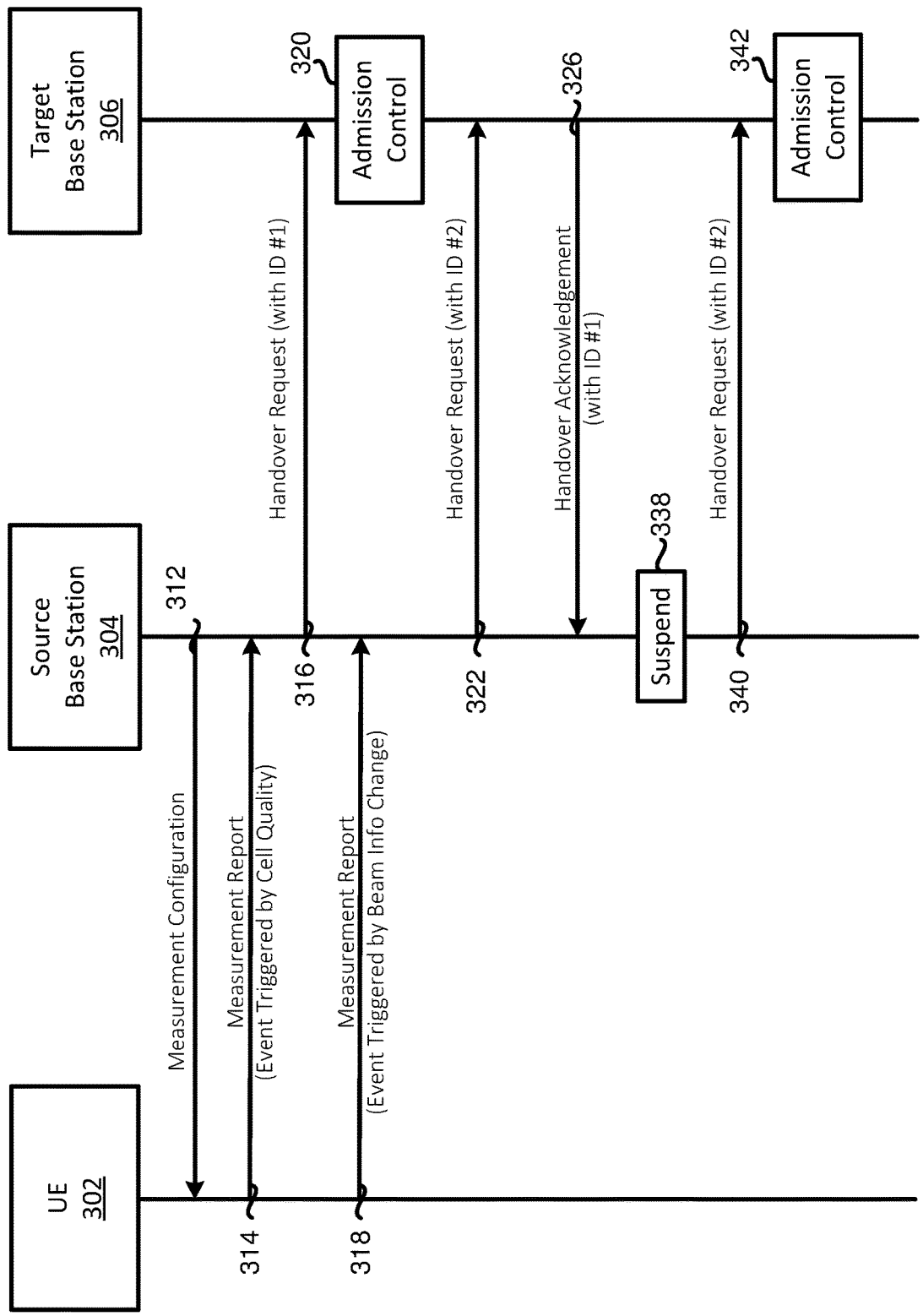
FIG. 3 is a schematic diagram illustrating a handover procedure for a UE to switch from a source base station to a target base station, according to an example implementation of the present application.

In Case 1-1-3, FIG. 3 illustrates a handover procedure for UE 302 to switch from source base station (e.g., source gNB) 304 to target base station (e.g., target gNB) 306, where the handover procedure includes actions 312, 314, 316, 318, 320, 322, 326, 338, 340, and 342. In the handover procedure in FIG. 3, if source base station 304 determines that the Handover Command is unacceptable, it may suspend the Handover Command message to UE 302, and may retransmit a Handover Request message with the latest measurement information.

In some implementations, source base station 304 may suspend the Handover Command message, and wait for the Handover Acknowledgement with ID #2 without retransmitting the Handover Request with ID #2 again. In some implementations, source base station 304 may activate a timer after sending an updated Handover Request 322 to target base station 306. If source base station 304 cannot receive an updated Handover Acknowledgement corresponding to the sent updated Handover Request 322 when the timer expires, source base station 304 may decide whether to transmit the Handover Command contained in the original Handover Acknowledgement, whether to suspend the Handover Command transmission, and/or whether to resent the updated Handover Request again.

Figure 4:
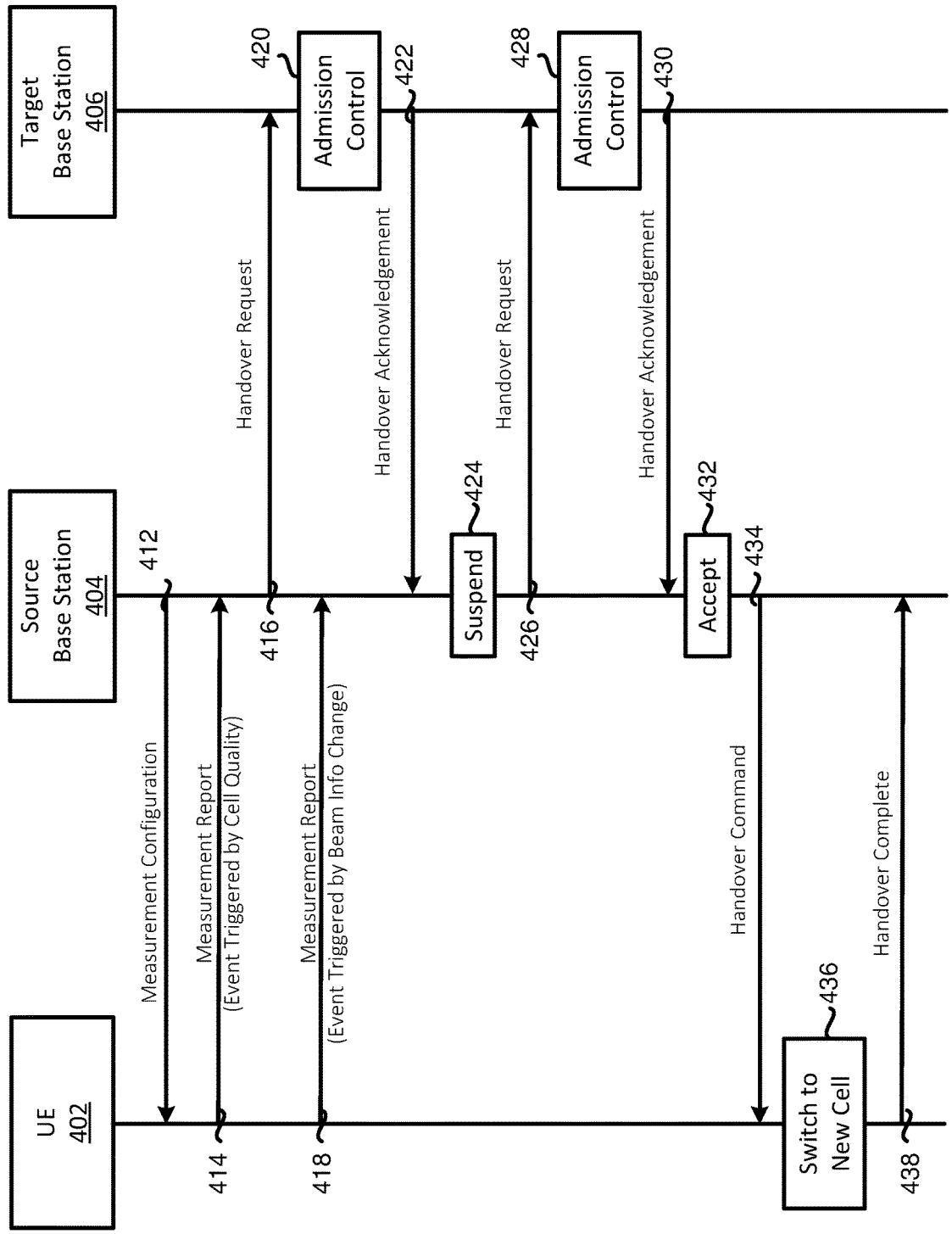
FIG. 4 is a schematic diagram illustrating a handover procedure for a UE to switch from a source base station to a target base station, according to an example implementation of the present application.

In Case 1-2, FIG. 4 illustrates a handover procedure for UE 402 to switch from source base station (e.g., source gNB) 404 to target base station (e.g., target gNB) 406, where the handover procedure includes actions 412, 414, 416, 418, 420, 422, 424, 426, 428, 430, 432, 434, 436, and 438. In the handover procedure in FIG. 4, source base station 404 does not send more than one Handover Request message before receiving the Handover Ack/NACK message.

Even when source base station 404 receives new beam information of the triggered cell, it waits for the Handover Acknowledgement in response to the corresponding Handover Request message, and suspends the Handover Command message to UE 402. Then, source base station 404 initiates another Handover Request message with the new beam information. In Case 1-2, no unique ID in the field of Handover Acknowledgement is required as shown in FIG. 4.

Figure 5:
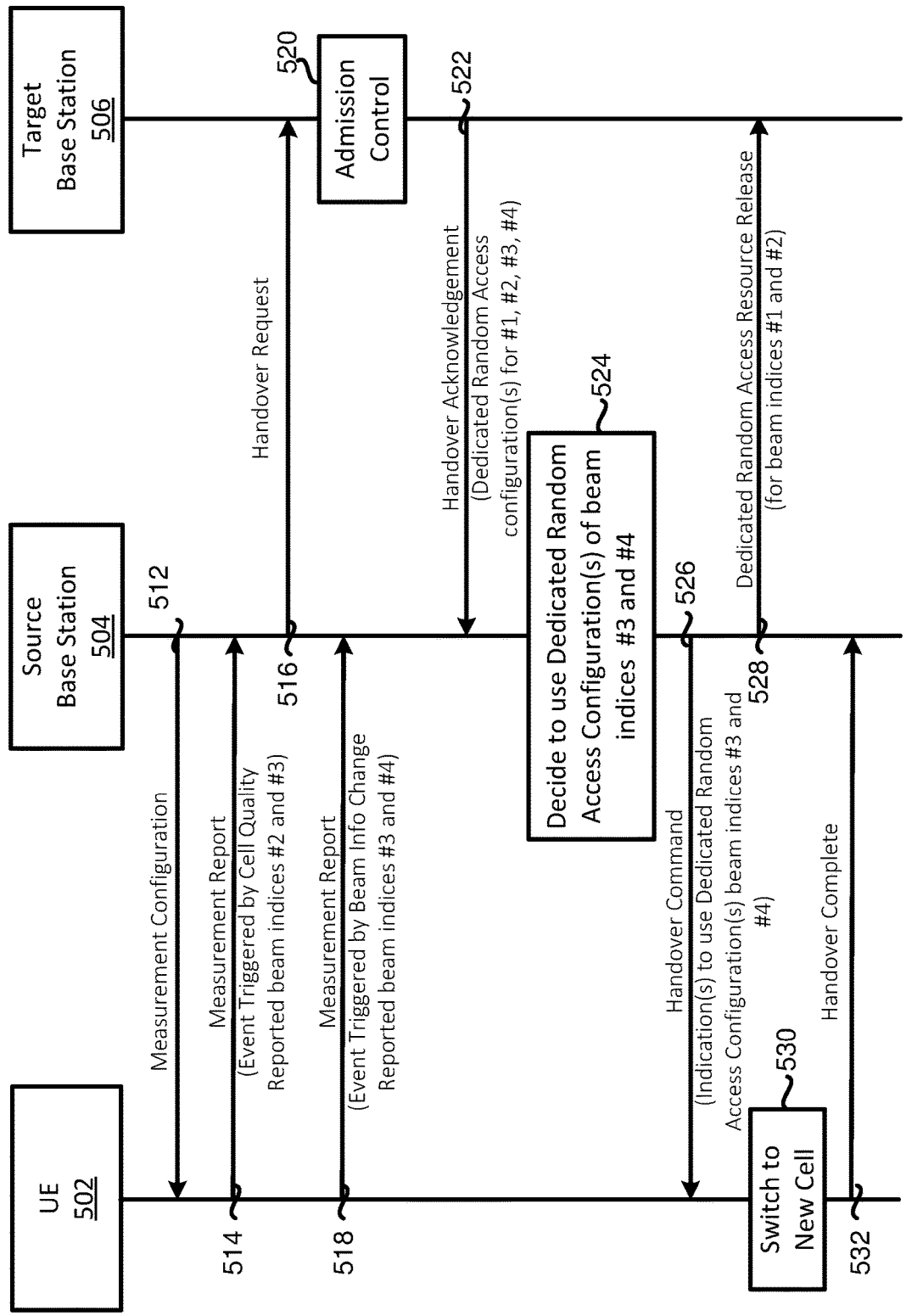
FIG. 5 is a schematic diagram illustrating a handover procedure for a UE to switch from a source base station to a target base station, according to an example implementation of the present application.

In Case 1-3-1, FIG. 5 illustrates a handover procedure for UE 502 to switch from source base station (e.g., source gNB) 504 to target base station (e.g., target gNB) 506, where the handover procedure includes actions 512, 514, 516, 518, 520, 522, 524, 526, 528, 530, and 532.

In FIG. 5, source base station 504 transmits the Handover Request message to target base station 506 with the latest measurement information (e.g., the best beam #2 and beam #3 in action 514). According to the measurement information, target base station 506 may accept the Handover Request message and aggressively set dedicated random access configuration(s) not only associated with beams #2 and #3, but also associated with the neighboring beams #1 and #4 in anticipation of the possible UE mobility. Once source base station 504 receives the Handover Acknowledgement message which indicates that the dedicated random access configuration(s) are allocated associated with beams #1, #2, #3, and #4, source base station 504 may further indicate to UE 502 in the Handover Command message in response to the latest measurement report (e.g., the new measurement report triggered by beam information change). In the present implementation, the new measurement report triggered by beam information change indicates that the best beams have changed to beams #3 and #4. Then, source base station 504 may indicate UE 502 to use only dedicated random access configuration(s) associated with beams #3 and #4 only in action 526. At the same time, source base station 504 may send a dedicated Resource Release message to target base station 506 to release dedicated random access configuration(s) associated with the unused beams (e.g., beams #1 and beam #2) in action 528.

Figure 6:
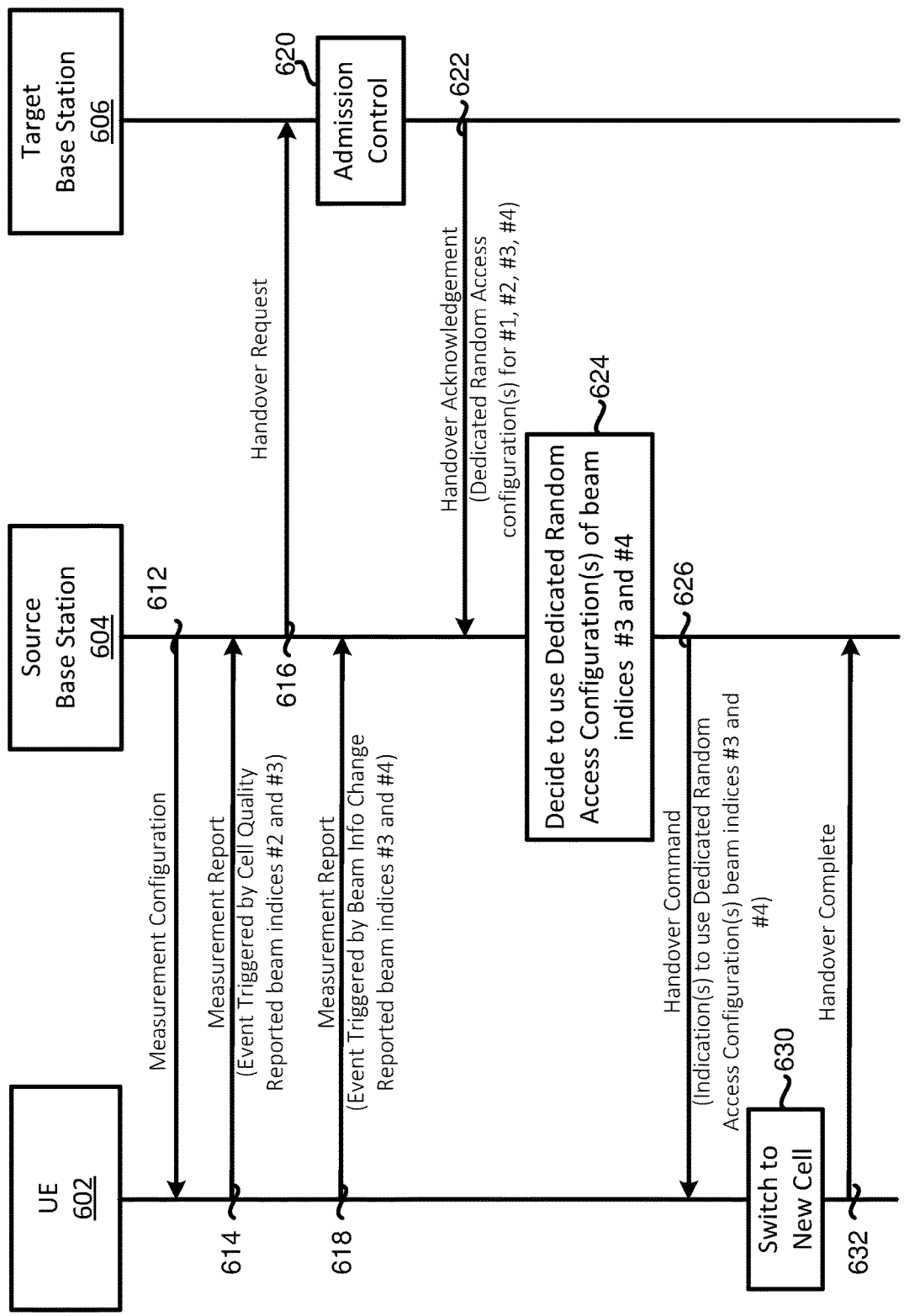
FIG. 6 is a schematic diagram illustrating a handover procedure for a UE to switch from a source base station to a target base station, according to an example implementation of the present application.

In Case 1-3-2, FIG. 6 illustrates a handover procedure for UE 602 to switch from source base station (e.g., source gNB) 604 to target base station (e.g., target gNB) 606, where the handover procedure includes actions 612, 614, 616, 618, 620, 622, 624, 626, 630, and 632. In the handover procedure in FIG. 6, the new measurement report triggered by beam information change indicates that the best beams have changed from beams #2 and #4 to beams #3 and #4. Then, source base station 604 may indicate UE 602 to use only dedicated random access configuration(s) associated with beams #3 and #4 only, but doesn't send a dedicated Resource Release to target base station 606 to release dedicated random access configuration(s) associated to beams #1 and #2.

Figure 7:
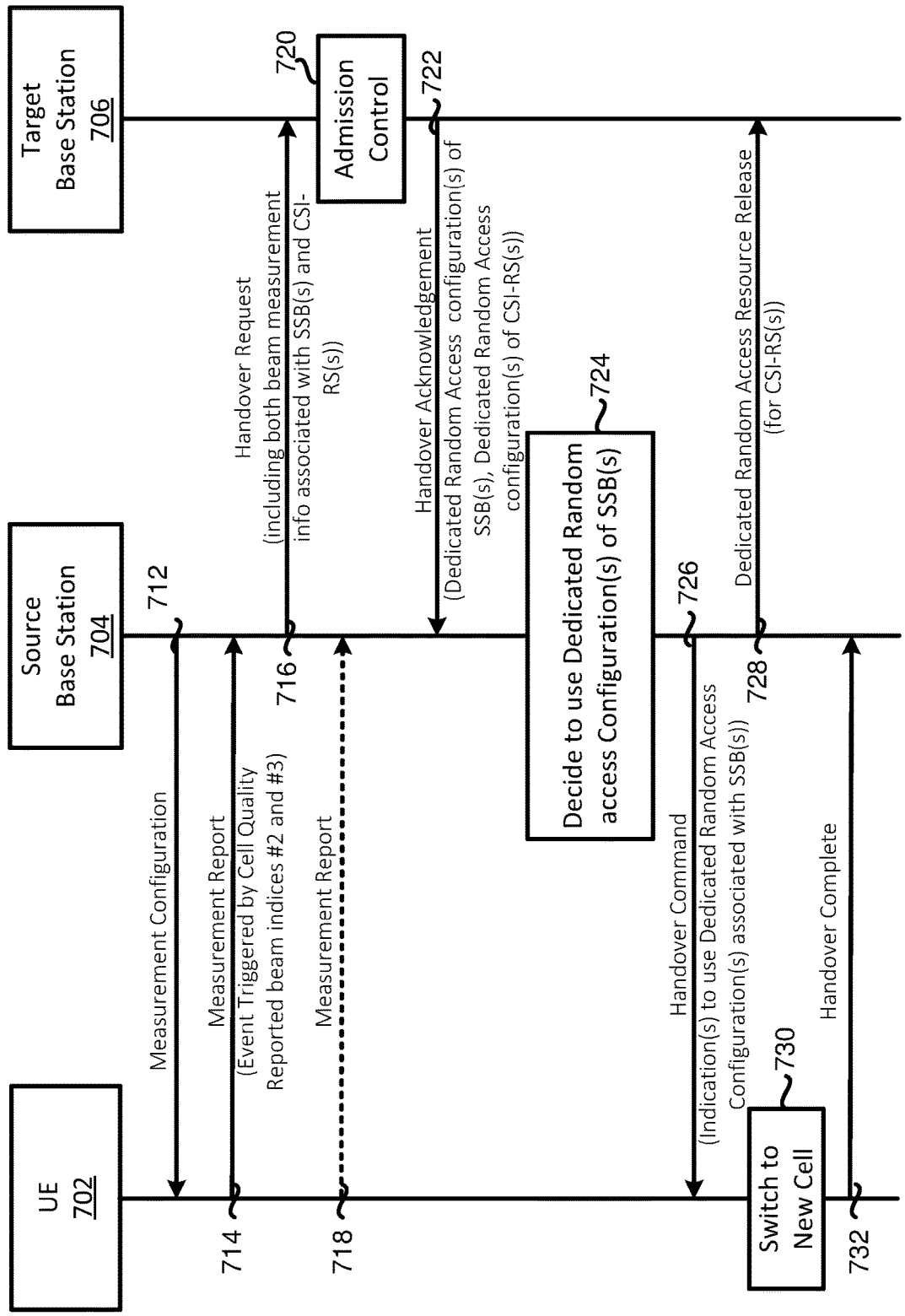
FIG. 7 is a schematic diagram illustrating a handover procedure for a UE to switch from a source base station to a target base station, according to an example implementation of the present application.

In Case 1-3-3, FIG. 7 illustrates a handover procedure for UE 702 to switch from source base station (e.g., source gNB) 704 to target base station (e.g., target gNB) 706, where the handover procedure includes actions 712, 714, 716, 718, 720, 722, 724, 726, 730, and 732.

In the handover procedure in FIG. 7, source base station 704 has both available beam measurement information associated to SSB(s) and CSI-RS(s), and sends a Handover Request message to target base station 706 with both of the two kinds of beam measurement information for admission control in action 716. After admission control in action 720, target base station 706 may transmit a Handover Acknowledgement message having both dedicated random access configuration(s) of SSB(s) and dedicated random access resources of CSI-RS(s) to source base station 704 in action 722. In action 724, in response to the latest measurement report, source base station 704 may decide to use one of the two kinds of dedicated random access configurations for UE 702. For example, source base station 704 may decide to use the dedicated random access configuration(s) of SSB(s) based on the latest measurement report (e.g., the signal strength of the previous target CSI-RS(s) (or the CSI-RS specific beam(s)) indicating bad signal quality). In action 726, source base station 704 may indicate UE 702 to use only the dedicated random access configuration(s) associated with SSB(s) only. Source base station 704 may also send the dedicated Resource Release to target base station 706 to release the dedicated random access configuration(s) associated with CSI-RS(s) in action 728.

Figure 8:
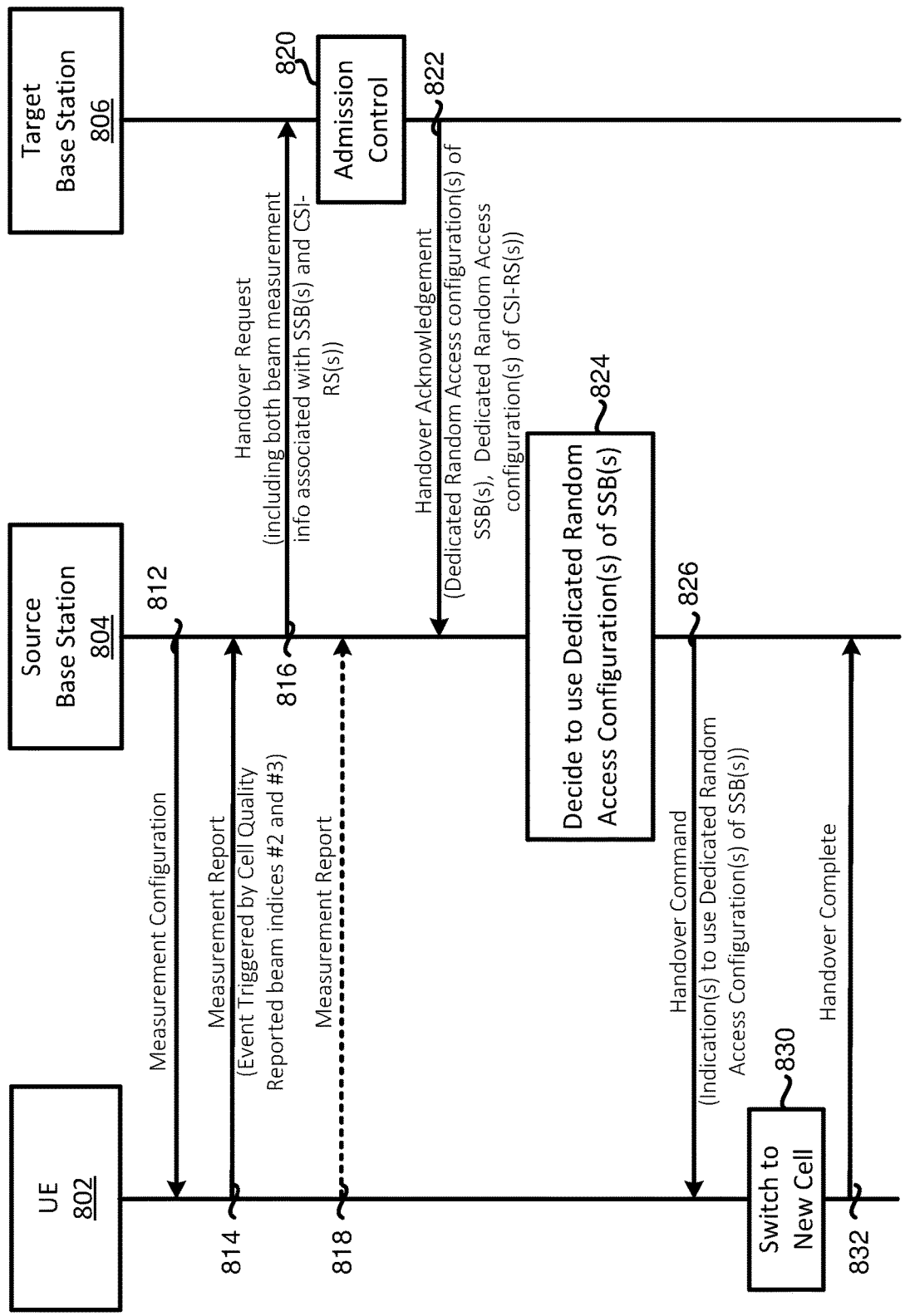
FIG. 8 is a schematic diagram illustrating a handover procedure for a UE to switch from a source base station to a target base station, according to an example implementation of the present application.

In Case 1-3-4, FIG. 8 illustrates a handover procedure for UE 802 to switch from source base station (e.g., source gNB) 804 to target base station (e.g., target gNB) 806, where the handover procedure includes actions 812, 814, 816, 818, 820, 822, 824, 826, 830, and 832.

In the handover procedure in FIG. 8, source base station 804 has both available beam measurement information associated to SSB(s) and CSI-RS(s), and sends a Handover Request message to target base station 806 with both of the two kinds of beam measurement information for admission control in action 816. After admission control, target base station 806 may transmit a Handover Acknowledgement message having both dedicated random access configuration(s) of SSB(s) and dedicated random access resources of CSI-RS(s) to source base station 804 in action 822. In action 824, in response to the latest measurement report, source base station 804 may decide to use one of the two kinds of dedicated random access configurations for UE 802. For example, source base station 804 may decide to use the dedicated random access configuration(s) of SSB(s) based on the latest measurement report (e.g., the signal strength of the previous target CSI-RS(s) (or the CSI-RS specific beam(s)) indicating bad signal quality). In action 826, source base station 804 may indicate UE 802 to use only the dedicated random access configuration(s) associated with SSB(s) only. Source base station 804 does not send the dedicated Resource Release to target base station 806 to release the dedicated random access resource associated to CSI-RS(s).

Case 2: Common Random Access Resources Usage During Handover Procedure

In the next generation (e.g., 5G NR) wireless communication networks, system information may be the same across a large area. For example, system information associated to system access (e.g., random access configuration during state transitions) may be the same in a large area. How to communicate information related to common random access configuration(s) to UEs during a handover procedure may present challenges, since UEs are not required to read the SI during handover procedure. In some implementations of the present application, a target base station doesn't need to provide common random access configuration(s) to a UE in the synchronous reconfiguration (e.g., ReconfigurationWithSync). In some implementations of the present application, a source base station is to mandatorily transmit its common random access configuration(s) to the target base station for verification.

Figure 9:
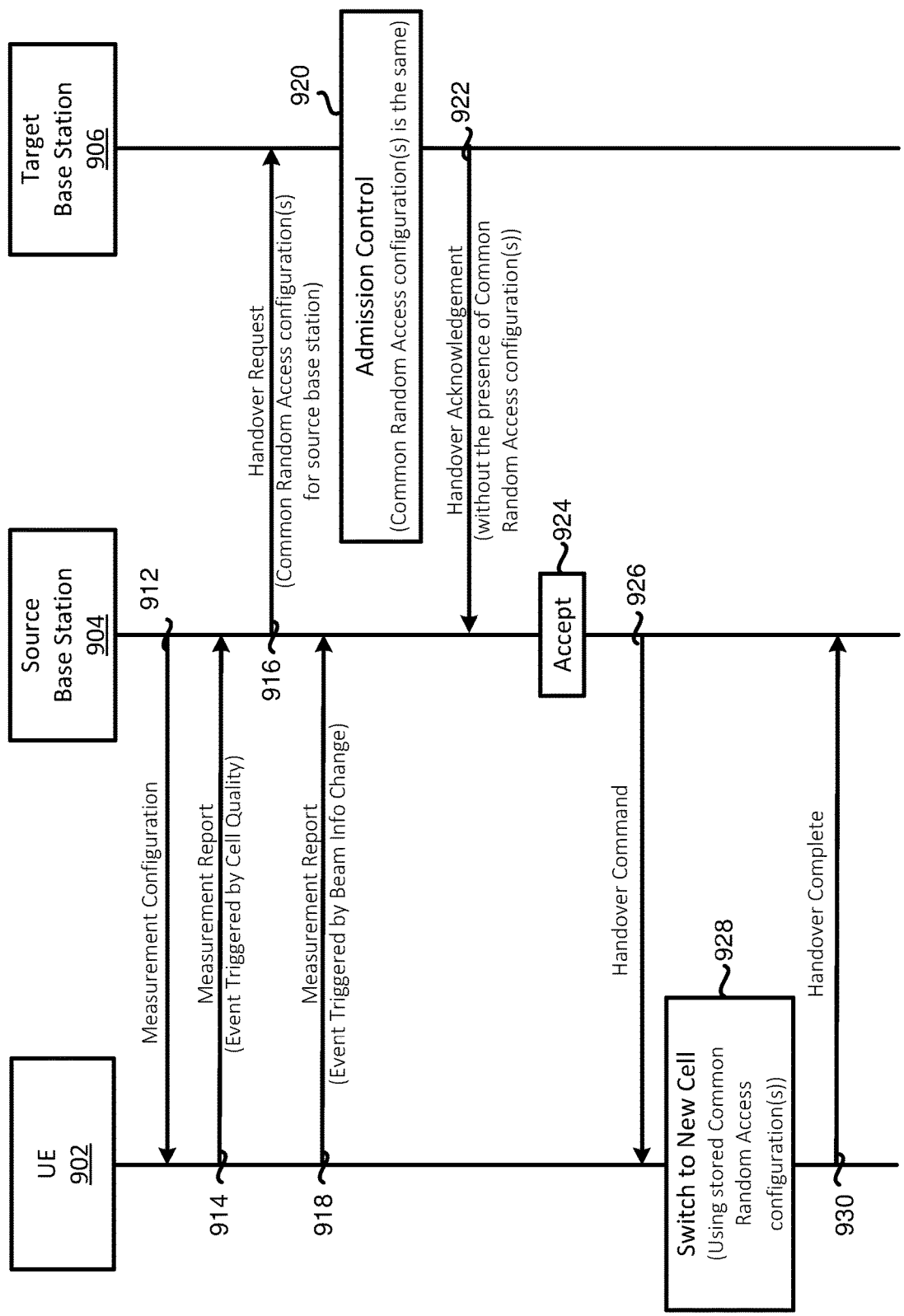
FIG. 9 is a schematic diagram illustrating a handover procedure for a UE to switch from a source base station to a target base station, according to an example implementation of the present application.

In Case 2-1, FIG. 9 illustrates a handover procedure for UE 902 to switch from source base station (e.g., source gNB) 904 to target base station (e.g., target gNB) 906, where the handover procedure includes actions 912, 914, 916, 918, 920, 922, 924, 926, 928, and 930. In the handover procedure in FIG. 9, if target base station 906 verifies that common random access configuration(s) is the same, it does not provide common random access configuration(s) in the synchronous reconfiguration (e.g., ReconfigurationWithSync) to UE 902 in action 922. Once UE 902 receives the synchronous reconfiguration (e.g., ReconfigurationWithSync) without common random access configuration(s), it may directly use the stored common random access configuration(s) for switching to the new cell without checking for additional system information in action 928.

Figure 10:
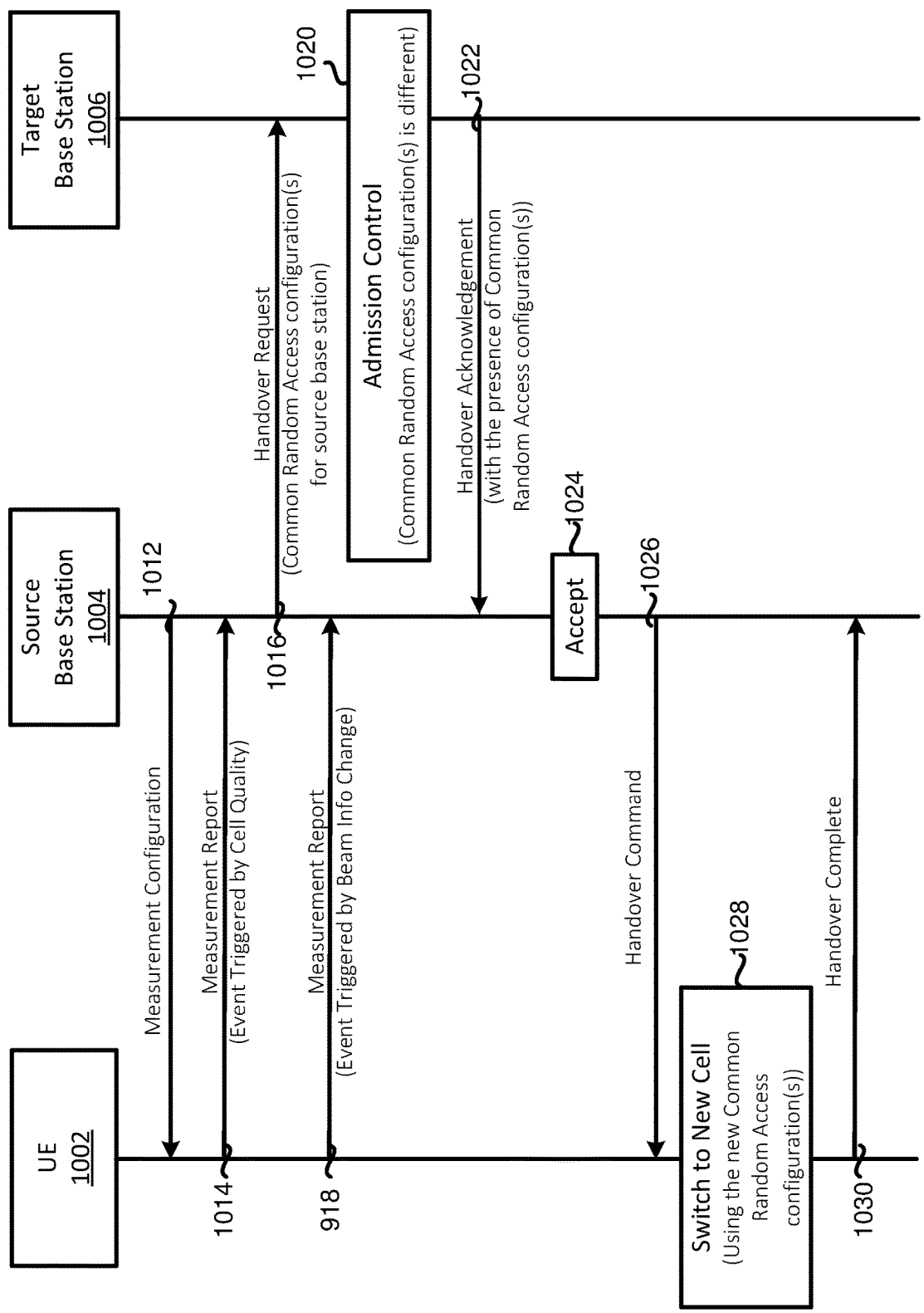
FIG. 10 is a schematic diagram illustrating a handover procedure for a UE to switch from a source base station to a target base station, according to an example implementation of the present application.

In Case 2-2, FIG. 10 illustrates a handover procedure for UE 1002 to switch from source base station (e.g., source gNB) 1004 to target base station (e.g., target gNB) 1006, where the handover procedure includes actions 1012, 1014, 1016, 1018, 1020, 1022, 1024, 1026, 1028, and 1030. In the handover procedure in FIG. 10, if target base station 1006 verifies that the common random access configuration(s) is different in action 1020, it provides common random access configuration(s) in the synchronous reconfiguration (e.g., ReconfigurationWithSync) to UE 1002 in action 1022. Once UE 1002 receives the synchronous reconfiguration (e.g., ReconfigurationWithSync) with the common random access configuration(s), it may directly use the new common random access configuration(s) for switching to the new cell in action 1028.

Case 3: Mechanisms for Selection Between Dedicated Random Access Configuration(s) and Common Random Access Configuration(s)

For fast access, dedicated random access configuration(s) (or resource(s)) shall be prioritized to use for access to the target cell, which is contention-free. However, if the UE is unable to (e.g., dedicated random access resources are not configured) or fails to use dedicated random access resources to access the target cell (if dedicated random access resources are configured), it should consider fallback options, such as using common random access configuration(s) (or resource(s)) to access the target cell before triggering the RRC Connection Re-establishment procedure. It should be noted that the dedicated random access resource could be associated to a SSB or a CRI-RS.

The problem is how and when a UE can determine that all dedicated random access resources are unable to be used or fail to complete the random access procedure to the target cell. There are two aspects to be considered, e.g., the quality of the associated beam and the number of times of access try. The target base station may provide a threshold for the beam(s) associated with the dedicated random access resource(s). Also, the target base station may provide a maximum number K of access try. In addition, for certain services, only the finer beams are able to provide the satisfied throughput. Therefore, fallback to use common random access resources may not be feasible. For such a case, the target base station may also indicate the UE whether the common random access resources can be used or not. If the common random access resource cannot be used once all dedicated random access resources are considered (when fulfilled some given criteria), the UE may not directly trigger the re-establishment procedure or notify the source base station by a handover failure information such that the source base station may take the alternative action, e.g., handover to another target base station or target cell by triggering a new handover request.

In various implementations of the present application, multiple preambles may be used for contention-free random access procedure. In this case, a UE may perform multiple continuous preambles with same preamble sequences on different dedicated random access resources of the same beam (with same or different transmission power level), and wait for a single RAR window for response and this would count as 1. It may be UE's implementation on whether it would use multiple random access preambles or not. For example, the UE may decide in response to the received random access resources. Or, the UE may allow to use multiple preambles for contention-free random access procedure by NW configurations. For CSI-RS specific beams, UE may need to know the association between dedicated random access resource and the corresponding CSI-RS specific beam.

In the following implementation(s), after admission control, the target base station may transmit a Handover Acknowledge with Handover Command in the container. The Handover Command may include the information of dedicated random access resources, the corresponding threshold for the beam associated with the dedicated random access resources, the maximum number K of random access attempts to try before allowing using common random access resources, and common random access resources allowance, multiple preamble transmission allowance.

The corresponding threshold for the beam associated with the dedicated random access resources is used to determine whether a beam associated to dedicated random access resources is qualified to be used (e.g., using RSRP threshold). Specifically, if the quality of the beam associated to dedicated random access resources is below the threshold, the UE is not allowed to use the corresponding dedicated random access resources to access the target cell. If the threshold is not present, the UE may use the threshold configured for cell quality derivation and beam reporting. In another implementation, the threshold may be always the same as the one configured for cell quality derivation and beam reporting. Thus, the threshold therefore does not need to be provided. In an alternative way, if the threshold is not present, it may depend on the UE implementation to determine the acceptable beam(s) to use random access resource(s).

The maximum number K of access try on dedicated random access resources before allowing using common random access resources may be present when the dedicated random access resources are allocated to the UE for fast access the target cell. There are a number of ways to count the maximum number K. For example, each random access attempt may count as 1 no matter each random access attempt is on the same beam or not. In another implementation, continuous random access attempts on the same beam may only count as 1. If K is present, the UE may only evaluate the beams associated with dedicated random access resources. If K is not present or set to infinite and dedicated random access configuration(s) are configured, it means that the UE may use dedicated random access resource(s) to access the target cell without using common random access resource(s) until the timer (e.g., T304, which is used for triggering RRC Connection Re-establishment procedure) expired.

In another implementation, if dedicated random access configuration(s) are configured, the UE may use dedicated random access resource(s) to access the target cell if there is at least one suitable beam (which quality is above the threshold) associated with dedicated random access resource(s). If the UE tries to initiate a random access attempt but there is no suitable beam (which quality is above the threshold) associated with dedicated random access resource(s), the first coming common random access resource(s) of the detectable beam associated with common random access resource(s) may be used for random access attempt. In some implementations, the definition of a detectable beam may the same as a suitable beam (i.e., a beam which quality is above the threshold given for SSB), in response to pre-defined criteria, or left for specific UE implementation(s). It is noted that the SSB-rsrp threshold is configured in random access common configuration and the CSI-RS-rsrp threshold is configured in dedicated random access configuration. Alternatively, if the UE tries to initiate a random access attempt but there is no suitable beam (which quality is above the threshold) associated with dedicated random access resource(s), the common random access resource(s) of the strongest detectable beam associated with common random access resource(s) is used for random access attempt. Even the UE uses common random access resource(s) for random access attempt, it may still use dedicated random access resource(s) again for the next random access attempt if the previous random access attempt on common random access resource(s) fails and there is at least one suitable beam (which quality is above the threshold) associated with dedicated random access resource(s).

Common random access resources allowance is a bit for indicating whether or not common random access resources can be used if the number of random access attempts on dedicated random access resources exceeds the maximum number K (if present). If the maximum number K is present and the UE is not allowed to use common random access resources to access the target cell, the UE may directly trigger the re-establishment procedure or notify the source base station for new command.

Multiple preamble transmission allowance is used to indicate whether multiple preamble transmission on the dedicated random access resource(s) of the same beam is allowed or not.

Figure 11:
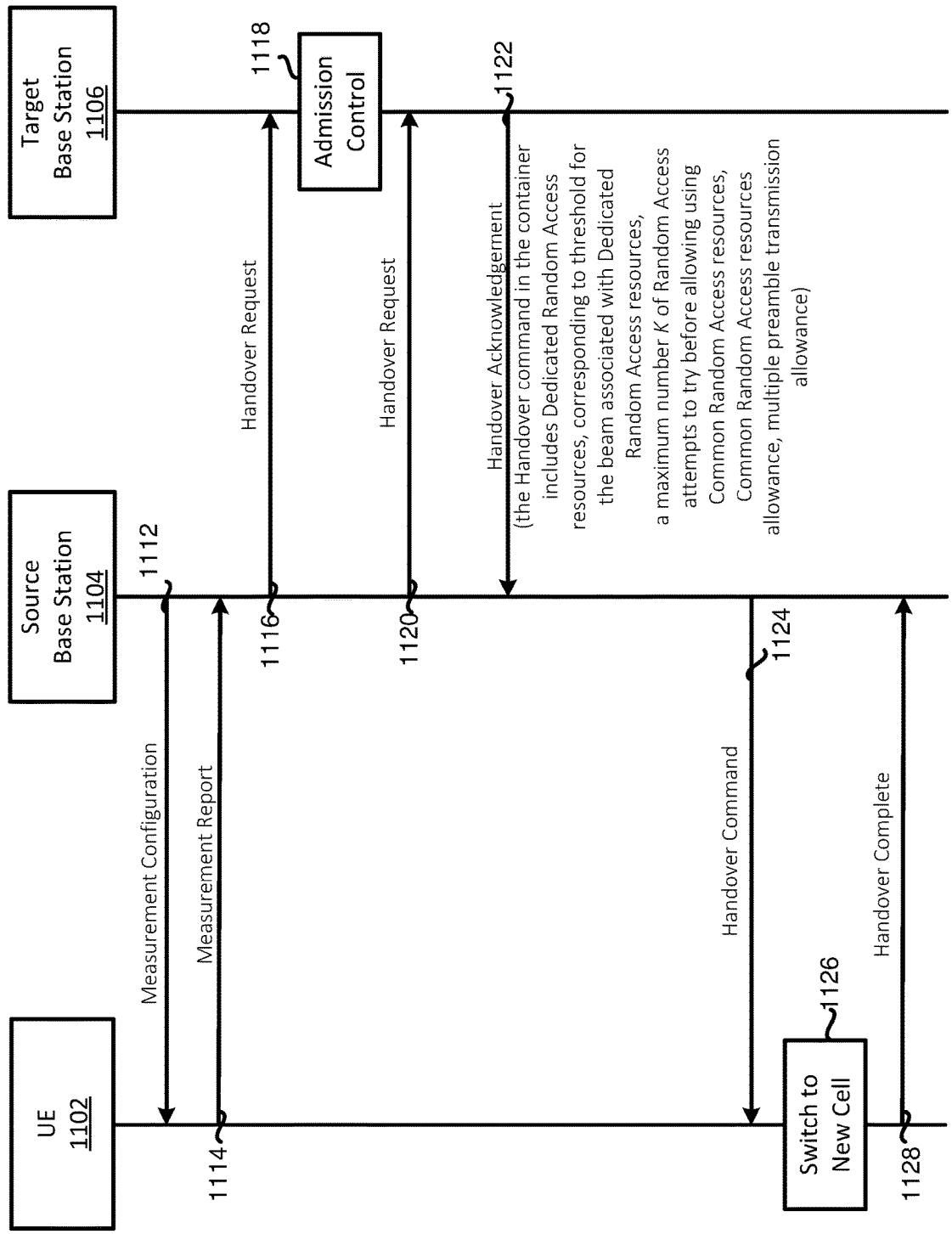
FIG. 11 is a schematic diagram illustrating a handover procedure for a UE to switch from a source base station to a target base station, according to an example implementation of the present application.

FIG. 11 illustrates a handover procedure for UE 1102 to switch from source base station (e.g., source gNB) 1104 to target base station (e.g., target gNB) 1106, where the handover procedure includes actions 1112, 1114, 1116, 1118, 1120, 1122, 1124, 1126, and 1128. In the handover procedure in FIG. 11, in the Handover Acknowledgement, the Handover Command in the container includes dedicated random access resources, corresponding to threshold for the beam associated with dedicated random access resources, a maximum number K of random access attempts to try before allowing using common random access resources, common random access resources allowance, and multiple preamble transmission allowance, as shown in action 1120 of FIG. 11.

In another implementation, the UE does not need to really perform random access try but to consider the first coming K dedicated random access resources of all beams associated with dedicated random access resource(s) for fast access. If the corresponding threshold for the beam associated with the dedicated random access resources is present, the UE may initiate the random access attempt on the first coming dedicated random access resource(s) of the suitable beam(s) associated with dedicated random access resource(s). If failed, the UE may initiate the random access attempt on the next coming dedicated random access resource(s) of the suitable beam(s) associated with dedicated random access resource(s) is used for random access attempt. The UE may only use the first coming K dedicated random access resources of all beams associated with dedicated random access resource(s). After passing the first K dedicated random access resources of all beams associated with dedicated random access resource(s), the UE may start to use common random access resources to access the target cell.

Figure 12:
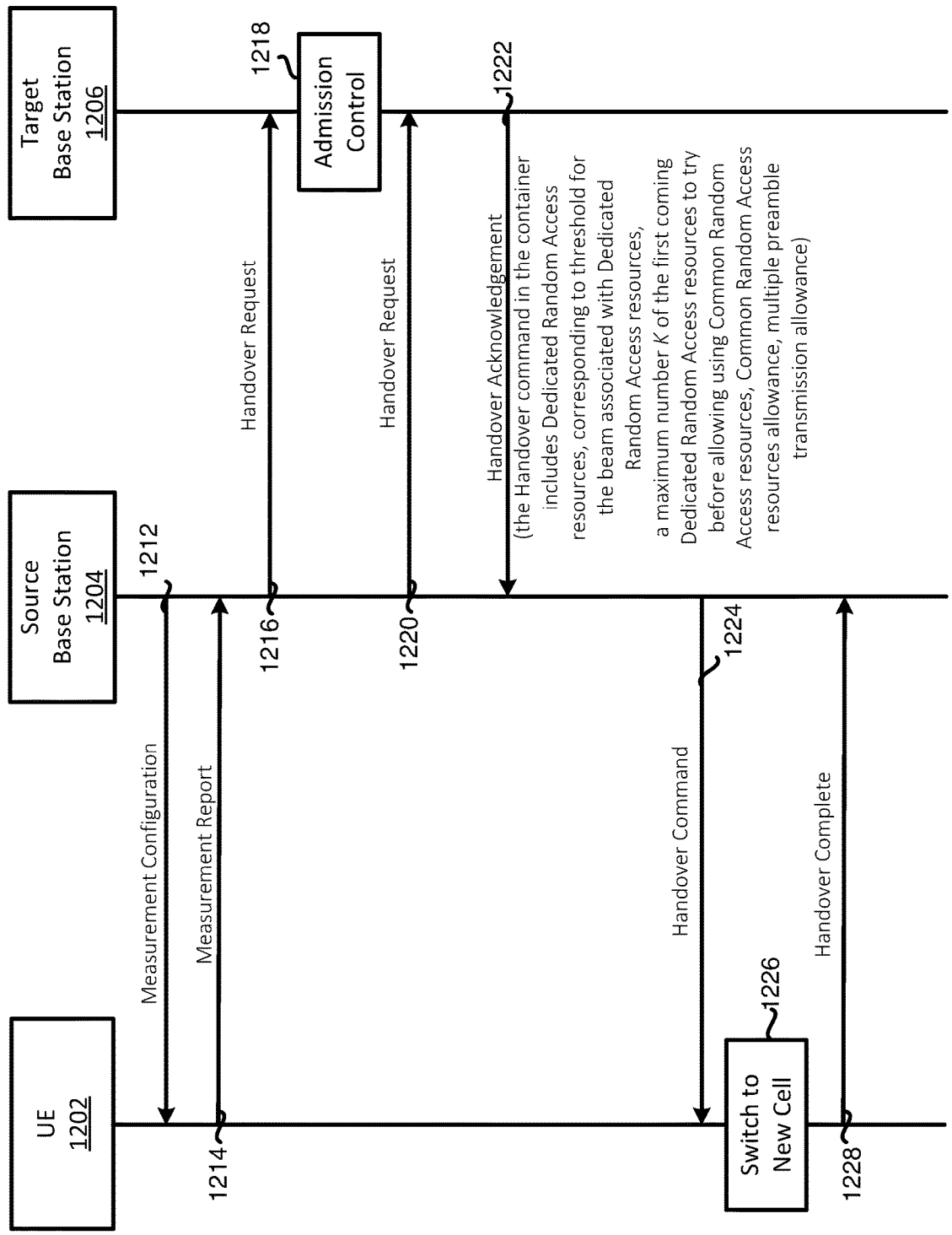
FIG. 12 is a schematic diagram illustrating a handover procedure for a UE to switch from a source base station to a target base station, according to an example implementation of the present application.

FIG. 12 illustrates a handover procedure for UE 1202 to switch from source base station (e.g., source gNB) 1204 to target base station (e.g., target gNB) 1206, where the handover procedure includes actions 1212, 1214, 1216, 1218, 1220, 1222, 1224, 1226, and 1228. In the handover procedure in FIG. 12, in the Handover acknowledgement, the Handover Command in the container includes dedicated random access resources, corresponding to threshold for the beam associated with dedicated random access resources, a maximum number K of the first coming dedicated random access resources to try before allowing using common random access resources, common random access resources allowance, and multiple preamble transmission allowance, as shown in action 1220 of FIG. 12.

In another implementation, a timer T-DR for using dedicated random access resources is configured. After receiving the Handover Command message, the UE may use dedicated random access resource(s) to access the target cell if there is at least one suitable beam (which quality is above the threshold) associated with dedicated random access resource(s) while the timer T-DR is running. If the timer T-DR is expired, the UE is allowed to use common random access resource(s) to access the target cell.

Figure 13:
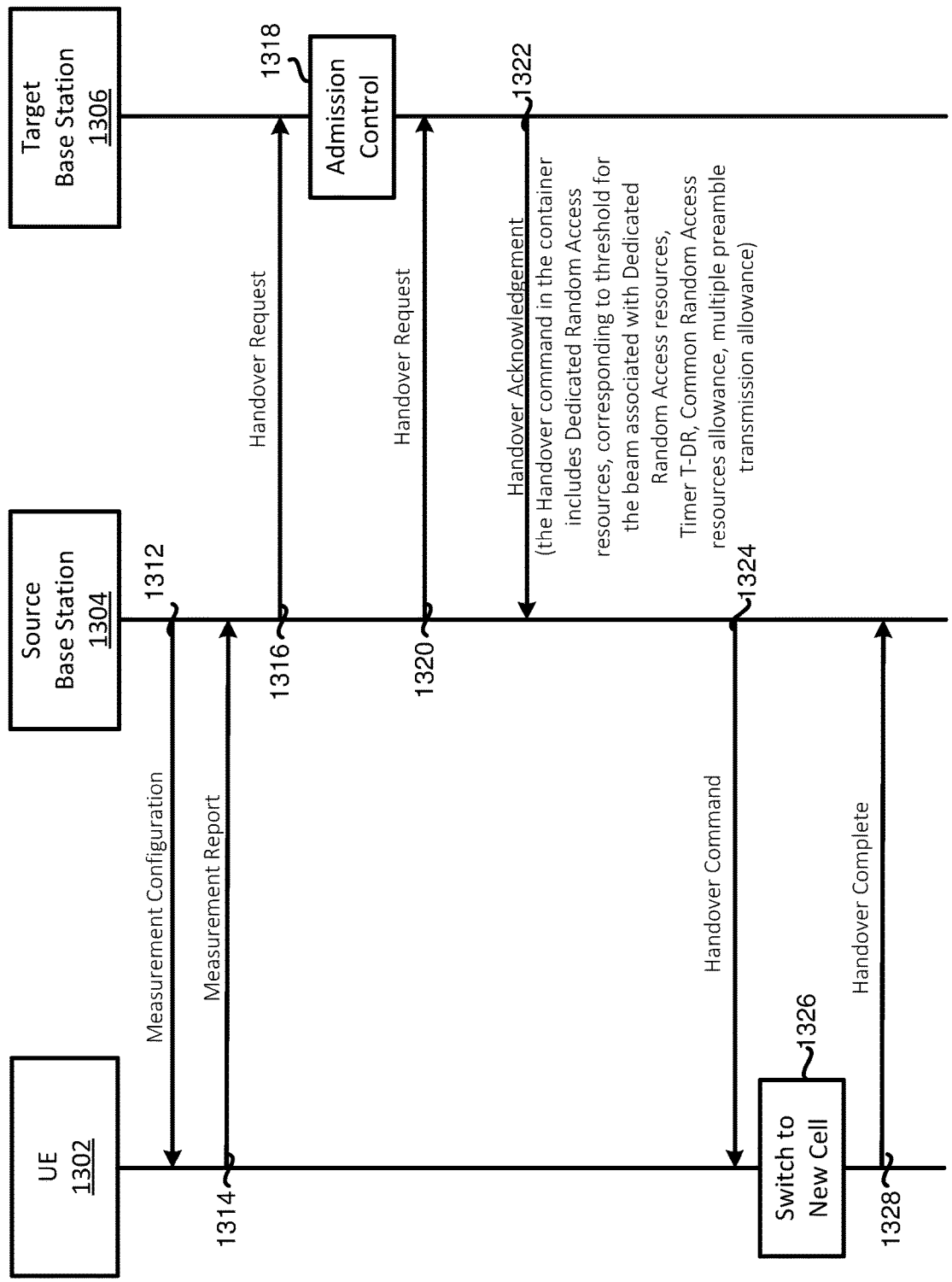
FIG. 13 is a schematic diagram illustrating a handover procedure for a UE to switch from a source base station to a target base station, according to an example implementation of the present application.

FIG. 13 illustrates a handover procedure for UE 1302 to switch from source base station (e.g., source gNB) 1304 to target base station (e.g., target gNB) 1306, where the handover procedure includes actions 1312, 1314, 1316, 1318, 1320, 1322, 1324, 1326, and 1328. In the handover procedure in FIG. 13, in the Handover acknowledgement, the Handover Command in the container includes dedicated random access resources, corresponding to threshold for the beam associated with dedicated random access resources, a Timer T-DR, common random access resources allowance, and multiple preamble transmission allowance, as shown in action 1320 in FIG. 13.

In various implantations of the present application, the target base station may include one or more of the random access configurations in the synchronous reconfiguration (e.g., ReconfigurationWithSync) to enable the UE to access the target cell. The random access configurations may include (i) common random access configuration associated with SSB(s), (ii) common random access configuration(s) associated with SSB(s) and dedicated random access configuration(s) associated with SSB(s), (iii) common random access configuration(s) associated with SSB and dedicated random access configuration(s) associated with CSI-RS.

Case 3-1: Common Random Access Configuration(s) Associated with SSB(s)

Figure 14:
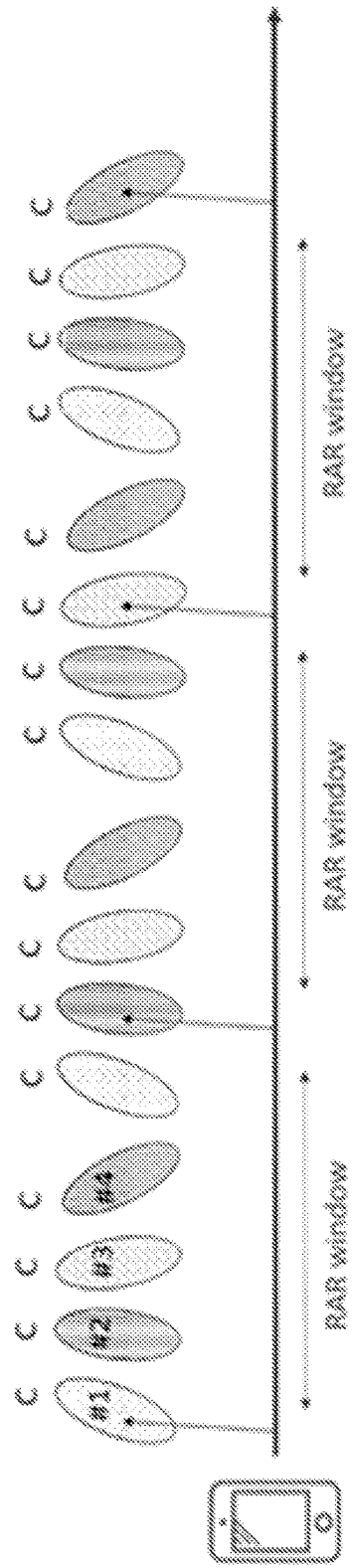
FIG. 14 is a schematic diagram illustrating detectable beams associated with one or more common random access resource(s) and/or dedicated random access resources during a handover procedure, according to an example implementation of the present application.

In Case 3-1-1, if there are no dedicated random access resource(s) allocated in the Handover Command, the first come first try principle is followed. As shown in FIG. 14, for all detectable beams, common random access resource(s) of beam #1 comes first when the UE receives the Handover Command message. Therefore, the UE may perform the random access procedure on common random access resource(s) of beam #1. If the random access procedure on common random access resource(s) of beam #1 fails (e.g., no corresponding RAR is received within the RAR window), the UE may try to perform the random access procedure on the next coming common random access resource(s) of a certain detectable beam. The definition of a detectable beam may be the same as a suitable beam, in response to pre-defined criteria, or left for specific UE implementation(s).

In Case 3-1-2, if there are no dedicated random access resource(s) allocated in the Handover Command or the UE falls back to use common random access resources (e.g., after maximum of access try of using dedicated random access resources), common random access resource(s) with the strongest detectable beam is used to access the target cell. Thus, the UE may perform the random access procedure on common random access resource(s) of strongest beam. If the random access procedure on common random access resource(s) of strongest beam fails (e.g., no corresponding RAR is received within the RAR window), the UE may try to perform the random access procedure on the common random access resource(s) of the detectable beam with the second highest quality.

Case 3-2: Common Random Access Configuration(s) Associated with SSB(s) and Dedicated Random Access Configuration(s) Associated with SSB(s)

Figure 15:
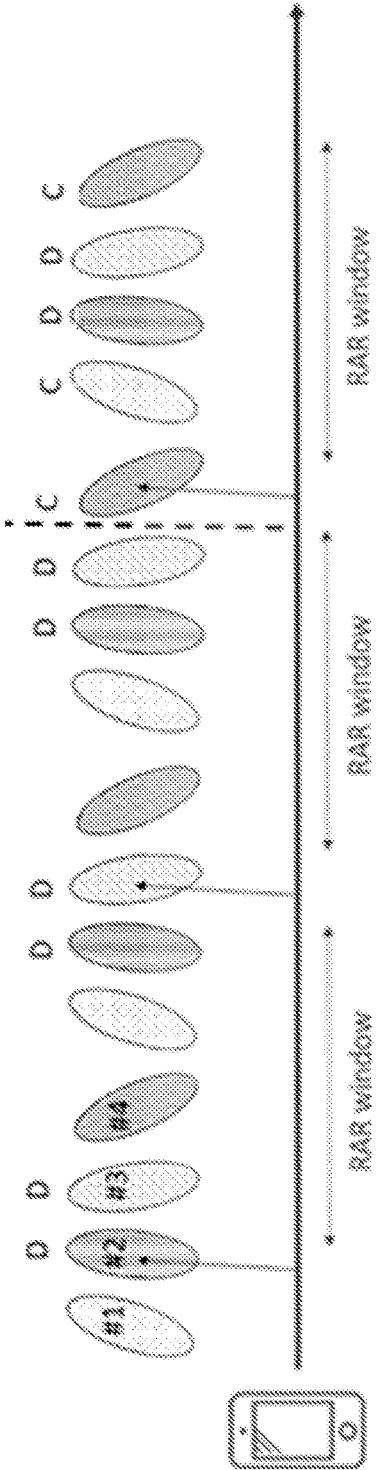
FIG. 15 is a schematic diagram illustrating detectable beams associated with one or more common random access resource(s) and/or dedicated random access resources during a handover procedure, according to an example implementation of the present application.

In Case 3-2-1, if there are dedicated random access resource(s) associated with NR-SS(s) (or SSB specific beam(s)) allocated in the Handover Command, the first coming dedicated random access resource(s) of all suitable beam(s) associated to dedicated random access resource(s) may be tried first. A suitable beam is one with the quality of the beam associated to dedicated random access resource(s)

being above the threshold. In the present implementation, the maximum number K of access try on dedicated random access resources before allowing using common random access resources is 2. As shown in FIG. 15, dedicated random access resources of beam #2 comes first among all the suitable beams after the UE receives the Handover Command message. Thus, the UE may perform the random access procedure on dedicated random access resource(s) of beam #2. If the random access procedure on dedicated random access resource(s) of beam #2 fails (e.g., no corresponding RAR is received within the RAR window), the UE may try to perform the random access procedure on the next coming dedicated random access resources of a suitable beam (which quality is above the threshold), which is beam #3 as shown in FIG. 15. In the same implementation, when the UE reaches the maximum number K of access try, before the timer (e.g., T304 timer or the like) is expired (which would trigger the RRC Connection Re-establishment Procedure), the UE is allowed to use common random access resource(s) of all detectable beams to access the target cell (if common random access resources allowance is set to true). The definition of a detectable beam may be the same as a suitable beam, in response to pre-defined criteria, or left for specific UE implementation(s). At this stage, the first come first try principle may then be followed. Specifically, the UE may perform random access procedure on the first coming random access resource(s) of all detectable beam(s). However, if the next beam the UE tries to access is the one which is associated with dedicated random access resource(s), the UE is still allowed to use dedicated random access resource(s) to access the target cell. It should be noted that when falling back to use common random access Resource(s), the UE may use common random access resource(s) with the strongest detectable beam to access the target cell as introduced in Case 3-1-2.

Figure 16:
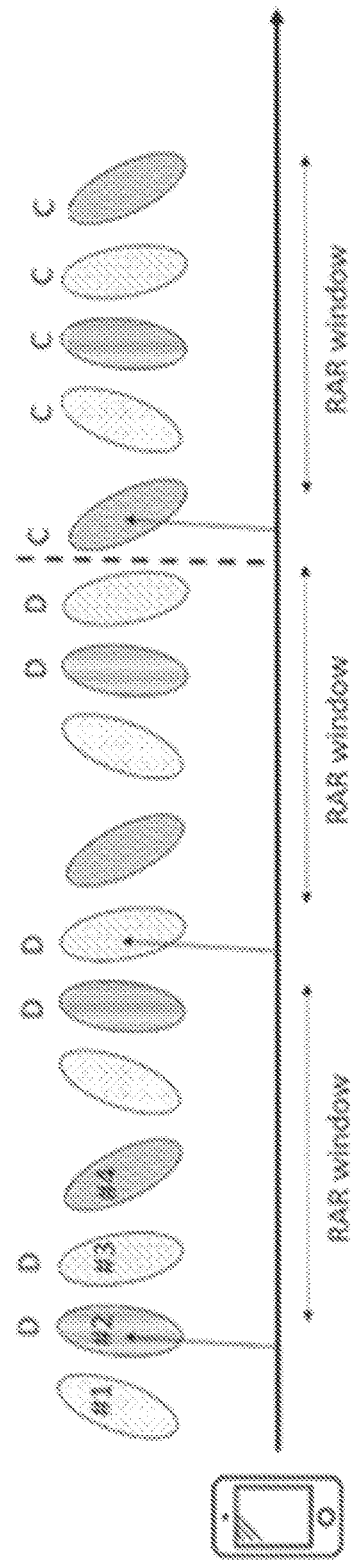
FIG. 16 is a schematic diagram illustrating detectable beams associated with one or more common random access resource(s) and/or dedicated random access resources during a handover procedure, according to an example implementation of the present application.

It should be noted that, in other implementations, the UE is not forbidden to still use common random access resource(s) of the detectable beam which is associated with dedicated random access resource(s) to access the target cell as shown in FIG. 16. This may be left for specific UE implementation(s) or according to the pre-defined rules (e.g., whether it is allowed to use common random access resource after the UE reaches the maximum number K of access attempts.)

Figure 17:
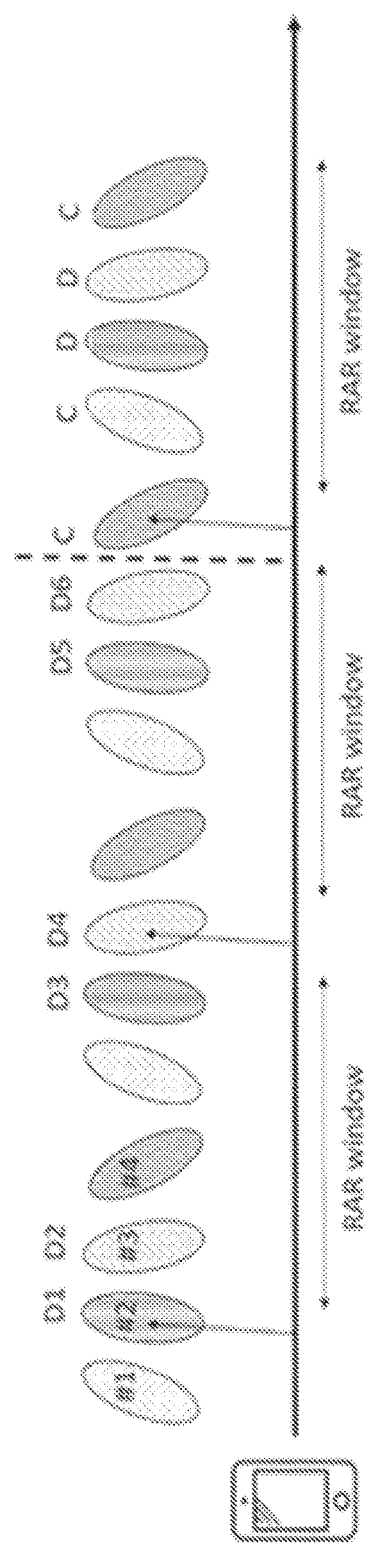
FIG. 17 is a schematic diagram illustrating detectable beams associated with one or more common random access resource(s) and/or dedicated random access resources during a handover procedure, according to an example implementation of the present application.

In Case 3-2-2, similar to Case 3-2-1, there are dedicated random access resource(s) associated with NR-SS(s) (or SSB specific beam(s)) allocated in the Handover Command, the first coming dedicated random access resource(s) of all suitable beam(s) associated with dedicated random access resource(s) would be attempted first. A suitable beam is the quality of the beam associated to dedicated random access resource(s) is above the threshold. However, in this implementation, the maximum number K of the first coming dedicated random access resources to try before allowing using common random access resource is set to 6. If the first 6 Dedicate random access Resource(s) have passed, the UE is then allowed to use common random access resource(s) of all detectable beams to access the target cell (if common random access resources allowance is set to true). The definition of a detectable beam may be the same as a suitable beam, in response to pre-defined criteria, or left for specific UE implementation(s) as shown in FIG. 17.

Figure 18:
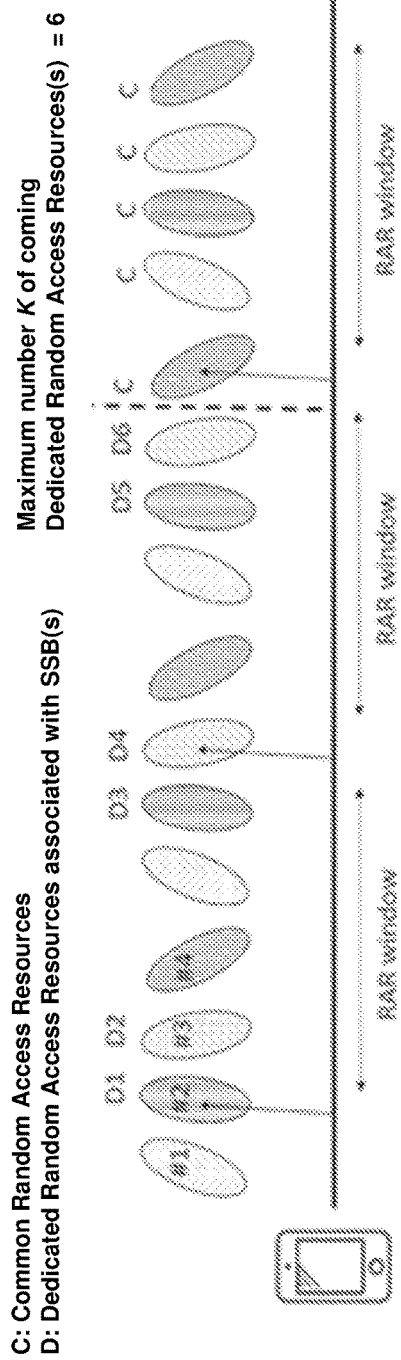
FIG. 18 is a schematic diagram illustrating detectable beams associated with one or more common random access resource(s) and/or dedicated random access resources during a handover procedure, according to an example implementation of the present application.

In another implementation, the UE is not forbidden to still use common random access resource(s) of this detectable beam which is associated dedicated random access resource(s) to access the target cell as shown in FIG. 18.

Figure 19:
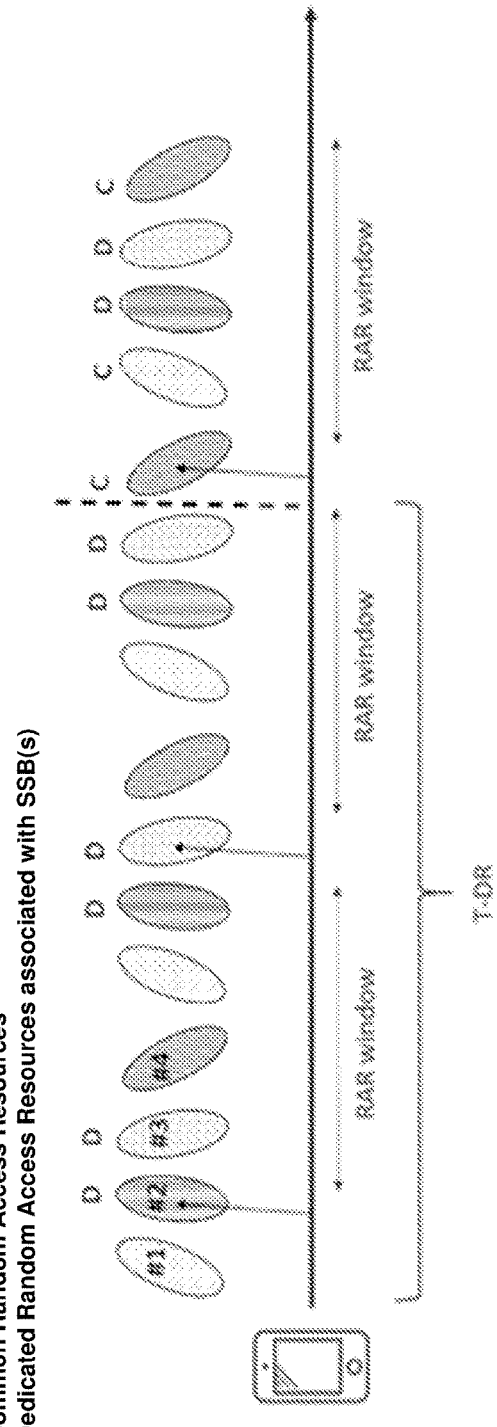
FIG. 19 is a schematic diagram illustrating detectable beams associated with one or more common random access resource(s) and/or dedicated random access resources during a handover procedure, according to an example implementation of the present application.

In Case 3-2-3, similar to Case 3-2-1, there are dedicated random access resource(s) associated with NR-SS(s) (or SSB specific beam(s)) allocated in the Handover Command, the first coming dedicated random access resource(s) of all suitable beam(s) associated to dedicated random access resource(s) may be attempted first. A suitable beam is the quality of the beam associated to dedicated random access resource(s) is above the threshold. But, in this implementation, a timer T-DR for using dedicated random access resources is configured. If the timer T-DR is expired, the UE is then allowed to use common random access resource(s) of all detectable beams to access the target cell (if common random access resources allowance is set to true). The definition of a detectable beam could be the same as a suitable beam, in response to pre-defined criteria, or left for specific UE implementation(s) as shown in FIG. 19.

In another implementation, the UE is not forbidden to still use common random access resource(s) of this detectable beam, which is associated dedicated random access resource(s) to access the target cell as shown in FIG. 20.

Case 3-3: Common Random Access Configuration(s) Associated with SSB(s) and Dedicated Random Access Configuration(s) Associated with CSI-RS(s)

In Case 3-3-1, if there are dedicated random access resources associated with CSI-RS(s) (or CSI-RS specific beam(s)) allocated in the Handover Command message, the first coming dedicated random access resource(s) of all suitable beams associated to dedicated random access resource(s). A suitable beam is that the quality of the beam associated to dedicated random access resource(s) is above the threshold. In the present implementation, the maximum number K of access try on dedicated random access resources before allowing using common random access resources is 3. As shown in FIG. 21, dedicated random access resource(s) of beam #A comes first among all the suitable beams after the UE receives the Handover command. Therefore, the UE may perform the random access procedure on dedicated random access resource(s) of beam #A. If the random access procedure on dedicated random access resource(s) of beam #A fails (e.g., no corresponding RAR is received within the RAR window), the UE may try to perform the random access procedure on the next coming dedicated random access resources of a suitable beam (which quality is above the threshold), which is beam #B as shown in FIG. 21. In FIG. 21, the beam #2 is a wide beam that covers the narrow beam #A and #B.

In the same implementation, when the UE reaches the maximum number K of access try, then, before the timer (e.g., T304 timer or the like) is expired (which would trigger the RRC Connection Re-establishment Procedure), the UE is then allowed to use the common random access resources of all detectable beams to access the target cell (if the common random access resources allowance is set to true). The definition of a detectable beam may be the same as a suitable beam, in response to pre-defined criteria, or left for specific UE implementation(s). In this stage, the first come first try principle may be followed. Specifically, the UE may perform random access procedure on the first coming random access resource(s) of all detectable beam(s). As shown in FIG. 21, the first coming common random access resource(s) of the detectable beam is beam #3, assuming that beam #2 is not detectable. However, no dedicated random access resources can be used anymore since the UE may already move out of the coverage of the CSI-RS specific beam(s) associated with dedicated random access resources. Note that when falling back to use common random access Resource(s), the UE may use common random access resource(s) with the strongest detectable beam to access the target cell as introduced in Case 3-1-2.

In another implementation, when the UE reaches the maximum number K of access try, before the timer (e.g., T304 timer or the like) is expired (which would trigger the RRC Connection Re-establishment Procedure), the UE is allowed to use the common random access resources of all detectable beams to access the target cell (if the common random access resources allowance is set to true). The definition of a detectable beam may be the same as a suitable beam, in response to pre-defined criteria, or left for specific UE implementation(s). In this stage, the first come first try principle is followed. Specifically, the UE would perform random access procedure on the first coming random access resource(s) of all detectable beam(s). However, the dedicated random access resources may still be used for avoiding contention-based random access procedure. It may be left to specific UE implementation(s), or by network configurations.

Figure 22:
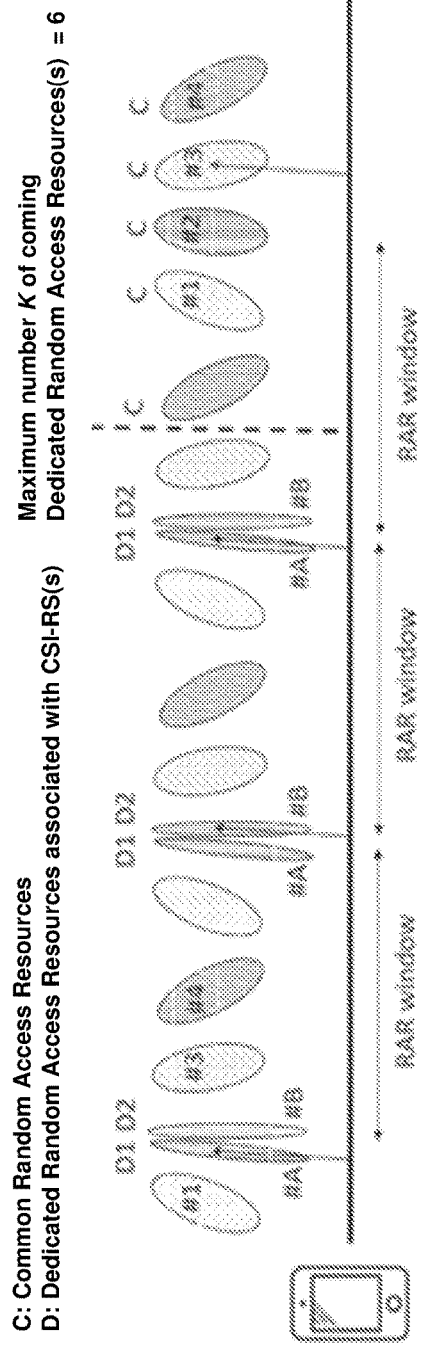
FIG. 22 is a schematic diagram illustrating detectable beams associated with one or more common random access resource(s) and/or dedicated random access resources during a handover procedure, according to an example implementation of the present application.

In Case 3-3-2, similar to Case 3-2-1, there are dedicated random access resources associated with CSI-RS(s) (or CSI-RS specific beam(s)) allocated in the Handover Command message, the first coming dedicated random access resource(s) of all suitable beams associated to dedicated random access resource(s). A suitable beam is that the quality of the beam associated to dedicated random access resource(s) is above the threshold. In the present implementation, the maximum number K of the first coming dedicated random access resources to try before allowing using common random access resource is set to 6. When the first 6 Dedicate random access Resource(s) have passed, the UE is then allowed to use common random access resource(s) of all detectable beams to access the target cell (if common random access resources allowance is set to true). The definition of a detectable beam may be the same as a suitable beam, in response to pre-defined criteria, or left for specific UE implementation(s) as shown in FIG. 22.

In another implementation, when the first coming K Dedicate random access Resource(s) have passed, the UE may still use dedicated random access resources for avoiding contention-based random access procedure. It may be left to specific UE implementation(s), or by network configurations.

Figure 23:
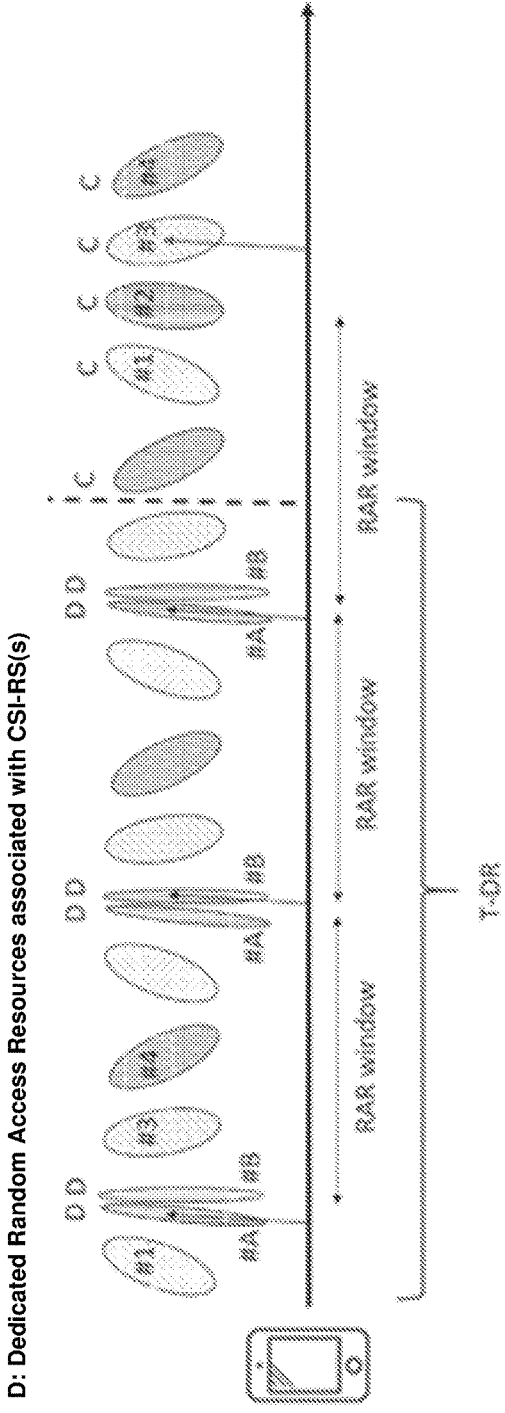
FIG. 23 is a schematic diagram illustrating detectable beams associated with one or more common random access resource(s) and/or dedicated random access resources during a handover procedure, according to an example implementation of the present application.

In Case 3-3-3, similar to Case 3-2-1, there are dedicated random access resources associated with CSI-RS(s) (or CSI-RS specific beam(s)) allocated in the Handover Command message, the first coming dedicated random access resource(s) of all suitable beams associated to dedicated random access resource(s). A suitable beam is that the quality of the beam associated to dedicated random access resource(s) is above the threshold. But, in the present implementation, a timer T-DR for using dedicated random access resources is configured. If the timer T-DR is expired, the UE is then allowed to use common random access resource(s) of all detectable beams to access the target cell (if common random access resources allowance is set to true). The definition of a detectable beam may be the same as a suitable beam, in response to pre-defined criteria, or left for specific UE implementation(s) as shown in FIG. 23.

In another implementation, if the timer T-DR is expired, the UE may still use dedicated random access resources for avoiding contention-based random access procedure. It may be left to specific UE implementation(s), or by network configurations.

Figure 24:
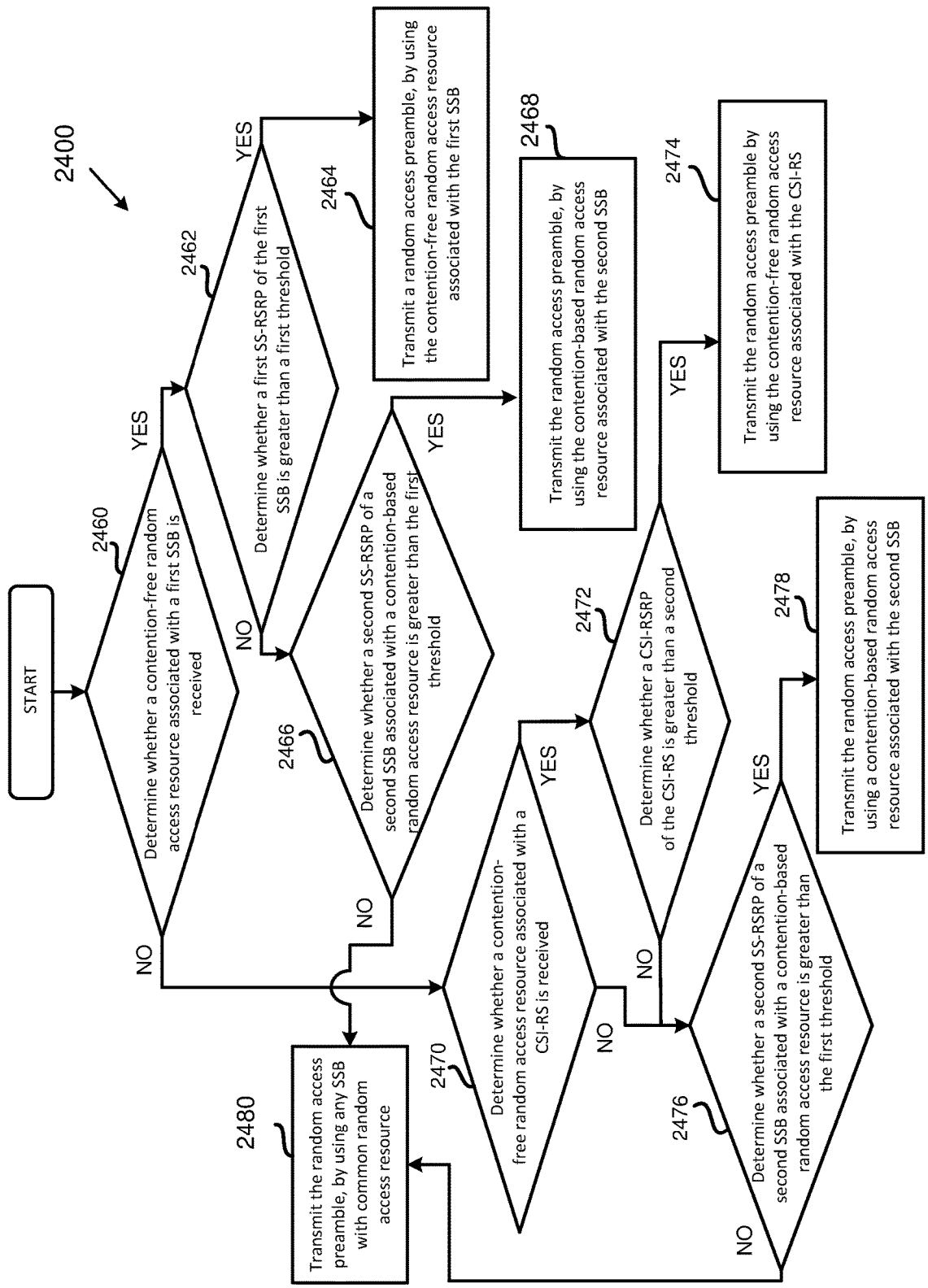
FIG. 24 is a flowchart illustrating a method performed by a UE for random access resource selection during a handover procedure, according to an example implementation of the present application.

FIG. 24 is a flowchart of a method performed by a UE during a handover procedure, according to an example implementation of the present application. As shown in FIG. 24, flowchart 2400 includes actions, 2460, 2462, 2464, 2466, 2468, 2470, 2472, 2474, 2476, 2478, and 2480.

In action 2460, the UE, through its processing circuitry, determines whether a contention-free random access resource associated with a first Synchronization Signal Block (SSB) is received. If the outcome of determination of action 2460 is Yes, flowchart 2400 proceeds to action 2462. If the outcome of determination of action 2460 is No, flowchart 2400 proceeds to action 2470.

In action 2462, the UE, through its processing circuitry, determines whether a first Synchronization Signal-Reference Signal Received Power (SS-RSRP) of the first SSB is greater than a first threshold. If the outcome of determination of action 2462 is Yes, flowchart 2400 proceeds to action 2464. If the outcome of determination of action 2462 is No, flowchart 2400 proceeds to action 2466.

In action 2464, when the first SS-RSRP of the first SSB is greater than the first threshold, then the UE, through its transmitting circuitry, transmits a random access preamble, by using the contention-free random access resource associated with the first SSB.

In action 2466, when the first SS-RSRP of the first SSB is not greater than the first threshold, the UE, through its processing circuitry, determines whether a second Synchronization Signal-Reference Signal Received Power (SS-RSRP) of a second SSB associated with a contention-based random access resource is greater than the first threshold. If the outcome of determination of action 2466 is Yes, flowchart 2400 proceeds to action 2468. If the outcome of determination of action 2466 is No, flowchart 2400 proceeds to action 2480.

In action 2468, when the second SS-RSRP of the second SSB associated with the contention-based random access resource is greater than the first threshold, the UE, through its transmitting circuitry, transmits the random access preamble, by using the contention-based random access resource associated with the second SSB.

In action 2470, when the outcome of determination of action 2460 is No, the UE determines whether a contention-free random access resource associated with a channel state information reference signal (CSI-RS) is received. If the outcome of determination of action 2470 is Yes, flowchart 2400 proceeds to action 2472. If the outcome of determination of action 2470 is No, flowchart 2400 proceeds to action 2476.

In action 2472, when the contention-free random access resource associated with the CSI-RS is received, the UE, through its processing circuitry, determines whether a Channel State Information-Reference Signal Received Power (CSI-RSRP) of the CSI-RS is greater than a second threshold. If the outcome of determination of action 2472 is Yes, flowchart 2400 proceeds to action 2474. If the outcome of determination of action 2472 is No, flowchart 2400 proceeds to action 2476.

In action 2474, when the CSI-RSRP of the CSI-RS is greater than the second threshold, the UE, through its transmitting circuitry, transmits the random access preamble by using the contention-free random access resource associated with the CSI-RS.

In action 2476, when the contention-free random access resource associated with CSI-RS is received, or when the CSI-RSRP of the CSI-RS is not greater than the second threshold, the UE, through its processing circuitry, determines whether a second SS-RSRP of a second SSB associated with a contention-based random access resource is greater than the first threshold. If the outcome of determination of action 2476 is Yes, flowchart 2400 proceeds to action 2478. If the outcome of determination of action 2476 is No, flowchart 2400 proceeds to action 2480.

In action 2478, when the second SS-RSRP of the second SSB associated with the contention-based random access resource is greater than the first threshold, the UE, through its transmitting circuitry, transmits the random access preamble, by using the contention-based random access resource associated with the second SSB.

In action 2480, when the outcome of determination of action 2466 or 2476 is No, the UE, through its transmitting circuitry, transmits the random access preamble, by using any SSB with common random access resource. In some implementations, the UE may not consider the first threshold when selecting the SSB in action 2480.

It should be noted that flowchart 2400 in FIG. 24 describes a random access selection mechanism during a random access procedure. However, in random access procedure, the random access selection mechanism may be triggered several times, for example, based on the response from the network.

Figure 25:
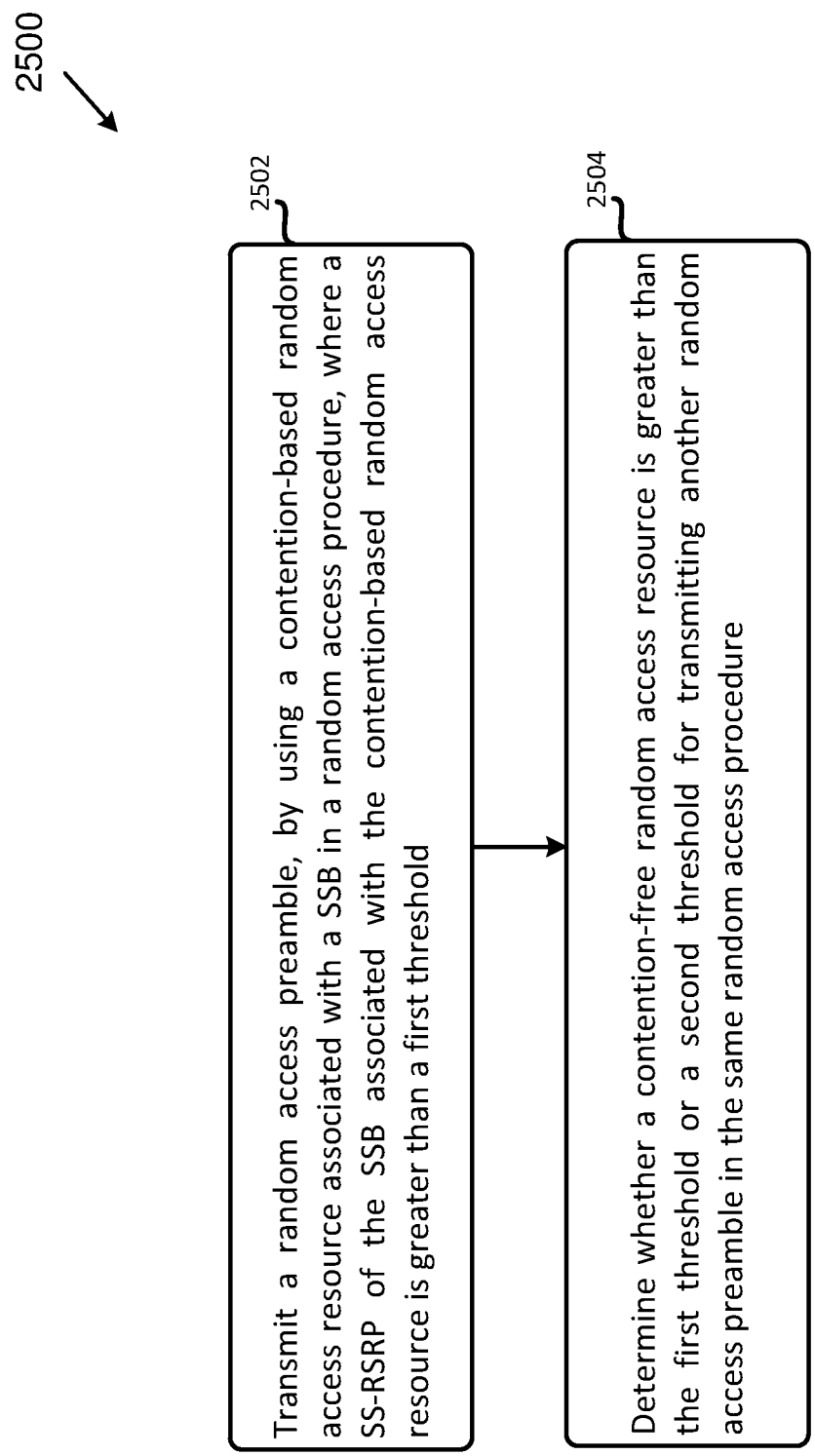
FIG. 25 is a flowchart illustrating a method performed by a UE for iteration of random access resource selections during a handover procedure, according to an example implementation of the present application.

FIG. 25 is a flowchart of a method performed by a UE for iteration of random access resource selections during a handover procedure, according to an example implementation of the present application. In FIG. 25, flowchart 2500 includes actions 2502 and 2054.

In action 2502, the UE transmits a first random access preamble, by using a contention-based random access resource associated with a SSB, during a random access procedure. In the present implementation, action 2502 may correspond to action 2468 or 2478 in FIG. 24. That is, during the first random access attempt, the UE first attempts to select dedicated random access resource(s) associated with a SSB (e.g., the first SSB above the first threshold in FIG. 24) to transmit the first random access preamble, but was not successful in doing so. Then, the UE attempts to transmit the first random access preamble, by selecting a contention-based random access resource associated with another SSB (e.g., the second SSB above the second threshold in FIG. 24), during the first random access attempt. In action 2502, the UE is able to transmit the first random access preamble, by using the contention-based random access resource associated with the SSB (e.g., the second SSB above the second threshold in FIG. 24), during a random access procedure.

In action 2504, during the same random access procedure, when there is another random access attempt (e.g., a second random access attempt), the UE may determine whether another contention-free random access resource is greater than the first threshold or the second threshold for transmitting another random access preamble. That is, even when the UE uses common random access resource(s) for a random access attempt during a random access procedure, the UE may, in a subsequent random access selection iteration during the same random access procedure, use dedicated random access resource(s) for the next random access attempt, even after the previous random access attempt on dedicated random access resource(s) failed, but there is at least one suitable beam(s) (whose quality is above the first threshold) associated with dedicated random access resource(s) available. Effectively, with reference to FIG. 24, after action 2468 or 2478, when another access attempt arises, the UE may start the random access selection mechanism again from action 2460 in flowchart 2400.

Figure 26:
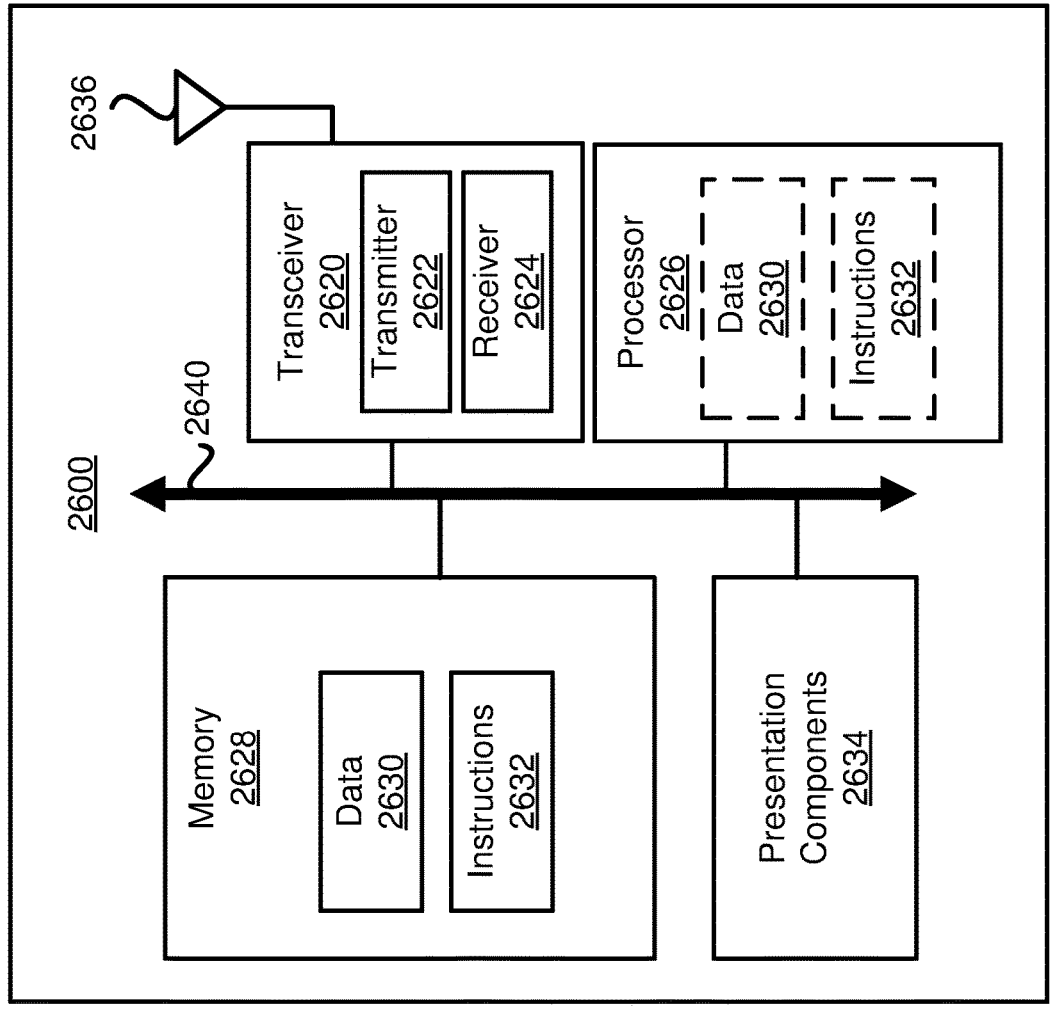
FIG. 26 is a block diagram illustrating a radio communication equipment, in accordance with an example implementation of the present application.

FIG. 26 illustrates a block diagram of a node for wireless communication, in accordance with various aspects of the present application. As shown in FIG. 26, a node 2600 may include a transceiver 2620, a processor 2626, a memory 2628, one or more presentation components 2634, and at least one antenna 2636. The node 2600 may also include an RF spectrum band module, a base station communications module, a network communications module, and a system communications management module, input/output (I/O) ports, I/O components, and power supply (not explicitly shown in FIG. 26). Each of these components may be in communication with each other, directly or indirectly, over one or more buses 2640. In one implementation, the node 2600 may be a UE or a base station that performs various functions described herein, for example, with reference to FIGS. 1 through 24.

The transceiver 2620 having a transmitter 2622 and a receiver 2624 may be configured to transmit and/or receive time and/or frequency resource partitioning information. In some implementations, the transceiver 2620 may be configured to transmit in different types of subframes and slots including, but not limited to, usable, non-usable and flexibly usable subframes and slot formats. The transceiver 2620 may be configured to receive data and control channels.

The node 2600 may include a variety of computer-readable media. Computer-readable media can be any available media that can be accessed by the node 2600 and include both volatile and non-volatile media, removable and non-removable media. By way of example, and not limitation, computer-readable media may include computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 2628 may include computer-storage media in the form of volatile and/or non-volatile memory. The memory 2628 may be removable, non-removable, or a combination thereof. Exemplary memory includes solid-state memory, hard drives, optical-disc drives, and etc. As illustrated in FIG. 26, The memory 2628 may store computer-readable, computer-executable instructions 2632 (e.g., software codes) that are configured to, when executed, cause the processor 2626 to perform various functions described herein, for example, with reference to FIGS. 1 through 24. Alternatively, the instructions 2632 may not be directly executable by the processor 2626 but be configured to cause the node 2600 (e.g., when compiled and executed) to perform various functions described herein.

The processor 2626 may include an intelligent hardware device, e.g., a central processing unit (CPU), a microcontroller, an ASIC, and etc. The processor 2626 may include memory. The processor 2626 may process the data 2630 and the instructions 2632 received from the memory 2628, and information through the transceiver 2620, the base band communications module, and/or the network communications module. The processor 2626 may also process information to be sent to the transceiver 2620 for transmission through the antenna 2636, to the network communications module for transmission to a core network.

One or more presentation components 2634 presents data indications to a person or other device. Exemplary presentation components 2634 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of random access resource selection, the method comprising:
    transmitting, by a target Base Station (BS), a first Synchronization Signal Block (SSB) to a User Equipment (UE), the first SSB associated with a first contention-free random access resource for the UE to transmit a random access preamble;
    transmitting, by the target BS, a second SSB to the UE, the second SSB associated with a contention-based random access resource; and
    in a case that a first Synchronization Signal-Reference Signal Received Power (SS-RSRP) of the first SSB is not greater than an SS-RSRP threshold and a second SS-RSRP of the second SSB is greater than the SS-RSRP threshold, receiving, by the target BS, the random access preamble from the UE using the contention-based random access resource, wherein:
        when dedicated Radio Resource Control (RRC) signaling, generated by the target BS, indicates the contention-based random access resource, the contention-based random access resource is determined based on the dedicated RRC signaling, and
        when the dedicated RRC signaling does not indicate the contention-based random access resource, the contention-based random access resource is determined based on a common random access configuration broadcast by a source BS.

2. The method of claim 1, further comprising:
    transmitting, by the target BS, a Channel State Information Reference Signal (CSI-RS) to the UE, the CSI-RS associated with a second contention-free random access resource; and
    in a case that the UE does not receive the first contention-free random access resource associated with the first SSB and a Channel State Information-Reference Signal Received Power (CSI-RSRP) of the CSI-RS is greater than a CSI-RSRP threshold, receiving, by the target BS, the random access preamble from the UE using the second contention-free random access resource.

3. The method of claim 2, wherein the CSI-RSRP threshold comprises an RSRP threshold for CSI-RSs.

4. The method of claim 1, wherein the SS-RSRP threshold comprises an RSRP threshold for SSBs.

5. The method of claim 1, further comprising:
    receiving, by the target BS, the random access preamble from the UE using the first contention-free random access resource in a case that the first SS-RSRP of the first SSB is greater than the SS-RSRP threshold.

6. The method of claim 1, further comprising:
    transmitting, by the target BS, the dedicated RRC signaling to the source BS, wherein the UE receives, from the source BS, the dedicated RRC signaling after the source BS receives the dedicated RRC signaling from the target BS.

7. The method of claim 1, wherein the dedicated RRC signaling indicates to the UE to handover to the target BS.

8. A system for random access resource selection, the system comprising:
    a source Base Station (BS) configured to broadcast a common random access configuration; and
    a target BS configured to:
    transmit a first Synchronization Signal Block (SSB) to a User Equipment (UE), the first SSB associated with a first contention-free random access resource for the UE to transmit a random access preamble;
    transmit a second SSB to the UE, the second SSB associated with a contention-based random access resource; and
    in a case that a first Synchronization Signal-Reference Signal Received Power (SS-RSRP) of the first SSB is not greater than an SS-RSRP threshold and a second SS-RSRP of the second SSB is greater than the SS-RSRP threshold, receive the random access preamble from the UE using the contention-based random access resource, wherein:
        when dedicated Radio Resource Control (RRC) signaling, generated by the target BS, indicates the contention-based random access resource, the contention-based random access resource is determined based on the dedicated RRC signaling, and
        when the dedicated RRC signaling does not indicate the contention-based random access resource, the contention-based random access resource is determined based on the common random access configuration broadcast by the source BS.

9. The system of claim 8, wherein the target BS is further configured to:
    transmit a Channel State Information Reference Signal (CSI-RS) to the UE, the CSI-RS associated with a second contention-free random access resource to the UE; and
    in a case that the UE does not receive the first contention-free random access resource associated with the first SSB and a Channel State Information-Reference Signal Received Power (CSI-RSRP) of the CSI-RS is greater than a CSI-RSRP threshold, receive the random access preamble from the UE using the second contention-free random access resource.

10. The system of claim 9, wherein the CSI-RSRP threshold comprises an RSRP threshold for CSI-RSs.

11. The system of claim 8, wherein the SS-RSRP threshold comprises an RSRP threshold for SSBs.

12. The system of claim 8, wherein the target BS is further configured to:
    receive the random access preamble from the UE using the first contention-free random access resource in a case that the first SS-RSRP of the first SSB is greater than the SS-RSRP threshold.

13. The system of claim 8, wherein the target BS is further configured to:
    transmit the dedicated RRC signaling to the source BS, wherein the UE receives, from the source BS, the dedicated RRC signaling after the source BS receives the dedicated RRC signaling from the target BS.

14. The system of claim 8, wherein the dedicated RRC signaling indicates to the UE to handover to the target BS.

\* \* \* \* \*